US011933621B2

(12) United States Patent
Sahu et al.

(10) Patent No.: US 11,933,621 B2
(45) Date of Patent: Mar. 19, 2024

(54) PROVIDING A LOCATION OF AN OBJECT OF INTEREST

(71) Applicant: QUALCOMM Incorporated, San Diego, CA (US)

(72) Inventors: Sumeet Kumar Sahu, Bangalore (IN); Vishnu Vardhan Kasilya Sudarsan, Bangalore (IN); Tapan Kumar Sahu, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 233 days.

(21) Appl. No.: 17/495,020

(22) Filed: Oct. 6, 2021

(65) Prior Publication Data
US 2023/0123242 A1  Apr. 20, 2023

(51) Int. Cl.
*G01C 21/34* (2006.01)
*G01C 21/36* (2006.01)
(Continued)

(52) U.S. Cl.
CPC ..... *G01C 21/3476* (2013.01); *G01C 21/3484* (2013.01); *G01C 21/3623* (2013.01);
(Continued)

(58) Field of Classification Search
CPC ............ G01C 21/3476; G01C 21/3484; G01C 21/3623; G01C 21/383; G01C 21/3837; G01C 21/3848; G01C 21/206; G06T 7/73; G06T 11/00; G06T 2207/20084; G06T 2207/10016; G06T 2219/004; G06T 7/579; G06T 19/006; G06V 10/95; G06V 20/00;
(Continued)

(56) References Cited

U.S. PATENT DOCUMENTS 9,398,413 B1 * 7/2016 Scalise ................. H04W 4/021
11,047,702 B1 * 6/2021 Meyer ................ G01C 21/3632
(Continued)

FOREIGN PATENT DOCUMENTS

CN    111966223 A  * 11/2020  .......... G02B 27/017
WO    2021002788 A1    1/2021

OTHER PUBLICATIONS

CN—111966223-A translation (Year: 2020).*
Boldt R., "The Last-Seen Image: an Image-Based Approach for Finding Lost Objects Using a Head-Mounted Display", Institute for Visualization and Interactive Systems, May 6, 2014, 77 pages.
International Search Report and Written Opinion—PCT/US2022/038430—ISA/EPO—dated Nov. 14, 2022.

*Primary Examiner* — Jason Holloway
*Assistant Examiner* — Kyle T Johnson
(74) *Attorney, Agent, or Firm* — QUALCOMM Incorporated

(57) ABSTRACT

Methods for providing a location of an object or objects of interest that may be performed by a processor of a computing device may include generating a map of an environment around the computing device by a first simultaneous location and mapping (SLAM) operation using information received from the optical sensor, identifying an object of interest in the environment of the computing device by an object recognition operation using information received from the optical sensor, determining a location of the object or objects of interest in the environment, and presenting the determined location of the object or objects of interest in the environment in response to a trigger event correlated to the object or objects of interest.

31 Claims, 10 Drawing Sheets

(51) Int. Cl.
*G06T 7/73* (2017.01)
*G06T 11/00* (2006.01)
*G06V 10/94* (2022.01)
*G06V 20/00* (2022.01)
*G06V 40/20* (2022.01)

(52) U.S. Cl.
CPC ............... *G06T 7/73* (2017.01); *G06T 11/00* (2013.01); *G06V 10/95* (2022.01); *G06V 20/00* (2022.01); *G06V 40/20* (2022.01); *G06T 2207/20084* (2013.01)

(58) Field of Classification Search
CPC ........ G06V 40/20; G06V 10/82; G06V 20/20; G06V 20/60; G06V 20/64; G06F 3/012; G06F 3/017; G06F 3/011; G02B 2027/014; G02B 27/017
See application file for complete search history.

(56) References Cited

U.S. PATENT DOCUMENTS

| | | | |
|---|---|---|---|
| 2016/0028917 A1* | 1/2016 | Wexler | H04N 23/50 |
| | | | 348/169 |
| 2016/0035141 A1* | 2/2016 | Suto | G06T 17/00 |
| | | | 345/633 |
| 2016/0285793 A1* | 9/2016 | Anderson | G06F 3/013 |
| 2016/0342858 A1* | 11/2016 | Tang | G06F 16/5866 |
| 2016/0373570 A1* | 12/2016 | Scavezze | H04W 4/025 |
| 2017/0201708 A1* | 7/2017 | Igarashi | H04N 23/63 |
| 2018/0189568 A1* | 7/2018 | Powderly | G06V 20/40 |
| 2018/0300897 A1* | 10/2018 | Woods | G06F 3/011 |
| 2018/0350144 A1* | 12/2018 | Rathod | G06Q 20/3224 |
| 2019/0163976 A1 | 5/2019 | Fu | |
| 2020/0066044 A1* | 2/2020 | Stahl | G06V 20/20 |
| 2022/0237816 A1* | 7/2022 | Jiang | G01C 21/3647 |
| 2023/0123242 A1* | 4/2023 | Sahu | G01C 21/3484 |
| | | | 701/424 |

* cited by examiner

PROVIDING A LOCATION OF AN OBJECT OF INTEREST

BACKGROUND

The pace of modern life is hectic and distracting. People often forget things at home or the office, such as keys, wallets, phones, ID badges, etc. Objects also get misplaced at home, such as remote controls. Time is wasted looking for such objects or returning to where they were left behind.

Fifth-generation New Radio (5G NR) systems provide support for services for wearable devices such as Head Mounted Displays (HMDs), such as smart glasses, Virtual Reality (VR) devices, Extended Reality (XR) devices, and the like. Some HMDs are configured with externally-facing cameras to record the environment around the user. Some HMDs may include up to six such cameras, enabling the HMID to record nearly 360 degrees around the wearer.

SUMMARY

Various aspects include methods that may be implemented on a processor of a computing device for informing a user of the location of an object of interest. Various aspects may include generating a map of an environment around the computing device by a first simultaneous location and mapping (SLAM) operation using information received from the optical sensor, identifying an object of interest in the environment of the computing device by an object recognition operation using information received from the optical sensor, determining a location of the object of interest in the environment operation, and presenting the determined location of the object of interest in the environment in response to a trigger event for presenting the location of the object of interest.

In some aspects, generating the map of an environment around the computing device by the first SLAM operation using information received from an optical sensor of the computing device may include identifying features of the environment around the computing device from the information received from the optical sensor and determining a position of the identified features, and identifying an object of interest in the environment of the computing device by an object recognition operation using information received from the optical sensor may include identifying the object of interest while identifying features of the environment around the computing device from the information received from the optical sensor and determining the position of the identified features to generate the map.

In some aspects, determining the location of the object of interest in the environment may include assigning to the object of interest coordinates, grid points, or mesh points within the map generated by the first SLAM operation. In some aspects, presenting the determined location of the object of interest in the environment may include generating a navigation path from a current location of the computing device to the location of the object of interest within the map generated by the first SLAM operation. In some aspects, presenting the determined location of the object of interest in the environment may include displaying an approximate distance from a current location of the computing device to the location of the object of interest. In some aspects, presenting the determined location of the object of interest in the environment may displaying an indication of a direction to the location of the object of interest from a current location of the computing device.

In some aspects, the trigger event for presenting the location of the object of interest may include a user input received by the computing device requesting the location of the object of interest. Some aspects may further include correlating the object of interest in the environment with a user action or behavior, in which the trigger event for presenting the location of the object of interest may include detecting an occurrence of the user action or behavior. Some aspects may further include correlating the object of interest in the environment with a user location, in which the trigger event for presenting the location of the object of interest may include detecting a user at or leaving a location.

Some aspects may further include correlating the object of interest in the environment with a user action or behavior and another condition, in which the trigger event for presenting the location of the object of interest may include detecting an occurrence of the user action or behavior in conjunction with occurrence of the other condition.

In some aspects, the trigger event for presenting the location of the object of interest may include a time trigger or a date trigger.

Some aspects may further include may further include correlating a plurality of objects of interest with a user behavior or action, determining locations of each of the plurality of objects of interest in response to detecting the user behavior or action, and displaying a location of any of the plurality of objects of interest that is not located with the user.

In some aspects, identifying an object of interest in the environment of the computing device by an object recognition operation using information received from the optical sensor may include applying images of objects identified in the environment of the computing device to a trained neural network configured to provide as an output identifications of objects of interest, and determining a location in the environment of the object of interest provided as output by the trained neural network.

Some aspects may further include receiving an indication that the object of interest has been relocated to a second location in the environment, in which presenting the determined location of the object of interest in the environment may include presenting the second location of the object of interest in the map generated by the first SLAM operation.

In some aspects, presenting the determined location of the object of interest in the map generated by the first SLAM operation in response to a trigger event for presenting the location of the object of interest may include determining whether the computing device is authorized to disclose the second location of the object of interest, presenting the second location of the object of interest in the map generated by the first SLAM operation in response to determining that the computing device is authorized to disclose the second location of the object of interest, and presenting an indication that the computing device is not authorized to disclose the second location of the object of interest in response to determining that the computing device is not authorized to disclose the second location of the object of interest.

Further aspects may include a processor for use in a computing device configured to perform operations of any of the methods summarized above. Further aspects may include a computing device including means for performing functions of any of the methods summarized above. Further aspects may include a computing device configured with processor-executable instructions to perform operations of any of the methods summarized above.

BRIEF DESCRIPTION OF THE DRAWINGS

The accompanying drawings, which are incorporated herein and constitute part of this specification, illustrate example embodiments, and together with the general description given above and the detailed description given below, serve to explain the features of various embodiments.

DETAILED DESCRIPTION

Figure 1:
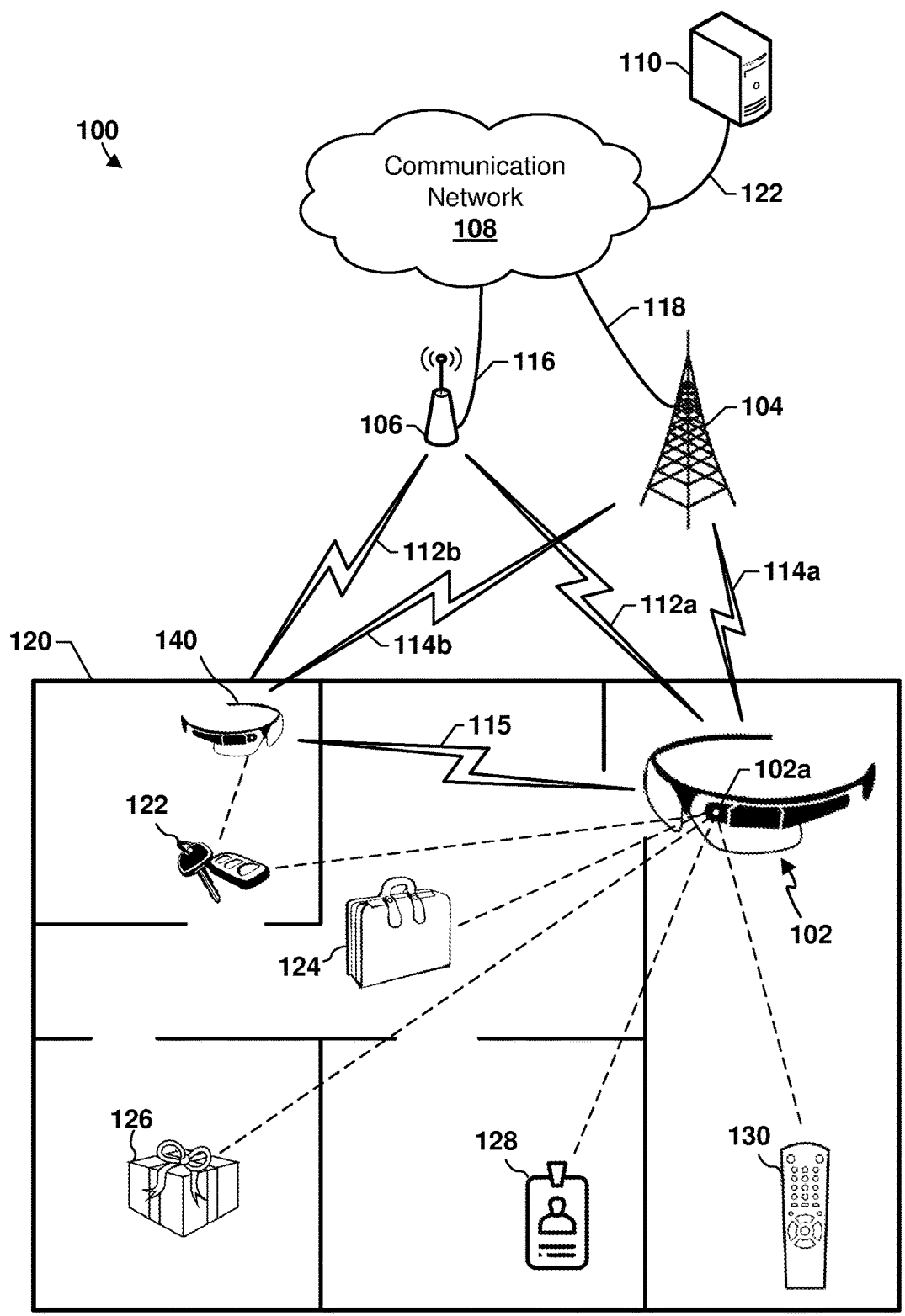
FIG. 1 is a system block diagram illustrating an example communications system suitable for implementing various embodiments.

Various embodiments will be described in detail with reference to the accompanying drawings. Wherever possible, the same reference numbers will be used throughout the drawings to refer to the same or like parts. References made to particular examples and embodiments are for illustrative purposes, and are not intended to limit the scope of the claims.

Various embodiments include methods that may be implemented on a processor of a computing device for providing a user with information (e.g., guidance to) the location of an object or objects of interest. In various embodiments, the computing device may be configured with an optical sensor (e.g., a camera). Various embodiments may use machine perception and recognition of objects within images gathered by the optical sensor of the computing device to locate an object or objects of interest within a map of the surroundings generated using SLAM techniques. The locations of objects of interest may be recorded in memory by the computing device (or a connected system). In response to a request for the location of the object or objects of interest, the computing device may recall the last known location of an object or objects of interest from memory, and provide the object's last known location to the user within the map in a manner that aids the user in finding the object, such as in images (e.g., an arrow or path) and/or numbers or text (e.g., a distance to the object or objects) presented in a head-mounted display or smart-glasses.

As used herein, the term "computing device" refers to an electronic device equipped with at least a processor, memory, and a device for presenting output such as a location of an object or objects of interest. In some embodiments, a computing device may include wireless communication devices such as a transceiver and antenna configured to communicate with wireless communication networks. In some embodiments, a computing device may be wearable by a person. A computing device may include any one or all of smart glasses, augmented/virtual reality devices, cellular telephones, smartphones, portable computing devices, personal or mobile multi-media players, laptop computers, tablet computers, 2-in-1 laptop/table computers, smartbooks, ultrabooks, multimedia Internet-enabled cellular telephones, wearable devices including smart-watches and smart-contact lenses, entertainment devices (e.g., wireless gaming controllers, music and video players, satellite radios, etc.), and similar electronic devices that include a memory, wireless communication components and a programmable processor. As used herein, the term "smart" in conjunction with a device, refers to a device that includes a processor for automatic operation, for collecting and/or processing of data, and/or may be programmed to perform all or a portion of the operations described with regard to various embodiments. For example, a smart-phone, smart-glasses, smart-contact lenses, smart-watch, smart-ring, smart-necklace, smart-cup, smart-straw, smart-appliances, etc.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single wireless device. The proximity of the SOCs facilitates high speed communications and the sharing of memory and resources.

As used herein, the terms "component," "system," "unit," "module," and the like include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a communication device and the communication device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

People may forget or misplace things at home or the office. Time is wasted looking for such objects or returning to where they were left behind. Various embodiments enable a computing device, such as a Head Mounted Display (HMD), smart glasses, etc. to employ machine perception of images gathered by an optical sensor (e.g., a camera) of the computing device to enable the locating of an object or objects of interest (e.g., a forgotten or lost item). Various embodiments enable a computing device to generate a map of an environment around the computing device by employing a first simultaneous location and mapping (SLAM) operation using information received from the optical sensor. In some embodiments, the computing device may perform the SLAM operation to identify features of the environment around the computing device from the information received from the optical sensor and determine a position of the identified features. It will be understood that references to "a SLAM operation" include one or more steps, processes, operations, computations, and/or the like, and is not a limitation to a single step, process, operation, computation, etc.

In various embodiments, the computing device may identify an object or objects of interest in the environment of the computing device by an object recognition operation using information received from the optical sensor. In some embodiments, the computing device may identify the object or objects of interest while identifying features of the environment around the computing device from the information received from the optical sensor and determining positions of the identified features to generate a map using SLAM processes, thereby locating a recognized object within the SLAM-generated map. In some embodiments, the computing device may provide an output indicating the identification of one or more objects of interest (e.g., highlighting the object or objects of interest in a display device, drawing a rectangle or circle around of the object or objects of interest in an augmented reality display of a head-mounted device, and the like). In some embodiments, the location of one or more objects of interest may be correlated to a particular grid or mesh location within a map of the environment, with the grid or mesh location used to indicate the location of the objects of interest.

In some embodiments, the computing device may receive an input from a user to trigger a scanning process to identify an object or objects of interest. Some embodiments may utilize a trained neural network to perform object identification or object recognition operations. In some embodiments, the computing device may apply images of objects identified in the environment of the computing device to a trained neural network configured to provide as an output identifications of objects of interest. In such embodiments, the computing device may determine a location in the environment of the object or objects of interest provided as output by the trained neural network during a SLAM operation. Examples of neural networks that may be used for object recognition include Region-Based Convolutional Neural Network (R-CNN), Fast R-CNN, Faster R-CNN, Histogram of Oriented Gradients (HOG), Region-Based Fully Convolutional Network (R-FCN), Single Shot Detector (SSD), Spatial Pyramid Pooling (SPP-net), and YOLO (You Only Look Once).

In some embodiments, the computing device may receive an input from a user to confirm an identification of an object or objects of interest made by the computing device. For example, the computing device may highlight a potential object of interest that the computing device has identified (e.g., a TV remote control). The computing device may receive an input (e.g., a button press, a gestural command, etc.) to confirm that the highlighted object is an object of interest. Similarly, the computing device may receive an input indicating that the highlighted object is not an object of interest.

In some embodiments, the computing device may determine a location of the object or objects of interest in the environment using a second SLAM operation. In some embodiments, the computing device may assign to the object or objects of interest coordinates within the map generated by the first SLAM operation, such as the operations performed by the computing device to generate the map of the environment around the computing device. In some embodiments, the computing device may assign to the object or objects of interest a grid or mesh location within the map generated by the first SLAM operation.

In some embodiments, the computing device may present the determined location of the object or objects of interest in the environment in response to a trigger event such as a user request for the location of the object or objects of interest. In some embodiments, the computing device may present an image on a head-mounted display, such as smart glasses, of the object or objects of interest at the determined location within a map of the environment determined by the SLAM operations. For example, the computing device may present a most recent image (e.g., a photo) of the object or objects of interest at the determined location within a map determined using SLAM methods. In some embodiments, the image of the object or objects of interest at the determined location may include a recent image (e.g., a most recent image) of the object or objects of interest obtained during or as a result of an object recognition operation performed by the computing device. In some embodiments, the computing device may present a representation of the map generated using the first SLAM operation that includes an indication (e.g., a highlight, a star, a blue dot, etc.) of the location of the object or objects of interest. In some embodiments, the computing device may present a grid or mesh representation of the map generated using the first SLAM operation, and indicate the location the object or objects of interest in the form of a highlighted grid or mesh location within the displayed map. In some embodiments, the computing device may use a sound output device (e.g., a speaker) to produce an audible indication of the location of the object or objects of interest (e.g., "your keys are on the counter next to the flowerpot").

In some embodiments, the computing device may generate a direction or navigation path from a current location of the computing device to the location of the object or objects of interest within the map generated by the first SLAM operation. In some embodiments, the computing device may output the generated navigation path for user on a display device (e.g., as a map or navigation path), via a sound output device (e.g., as a step or series of steps to move from the computing device's current location to be location of the object or objects of interest), etc. In some embodiments, the computing device may render on a display device of the computing device (e.g., display of smart glasses or an HMD) an indication, such as an arrow or similar pointing icon, of the direction from the computing device to the location of the object or objects of interest. In some embodiments, the computing device may determine the distance to the location of the object or objects of interest from the location of the computing device, and present the distance to the user, such as in the form of a number and/or text presented on a display of the computing device (e.g., display of smart glasses or an HMD).

The computing device may present the determined location of the object or objects of interest in the environment in response to a trigger event for presenting the location of the object or objects of interest. In some embodiments, the trigger event or user request for the location of the object or objects of interest may include a user input (e.g., a button push, touch screen interaction and/or verbal command or query) received by the computing device requesting the location of the object or objects of interest. In some embodiments, such input may include a query, a command, an instruction, etc. received by the computing device verbally, via a gestural command, or through any manner of input device. Other trigger events described in more detail herein include recognition of a user behavior or action correlated to a specific object or objects of interest, recognition of a user behavior or action correlated to a specific object or objects of interest and to other conditions (e.g., time of day, day of week, weather conditions, etc.), and/or recognition of a user behavior or action correlated to a specific object or objects of interest (and optionally other conditions) and determination that one or more of the correlated objects of interest are not with the user.

In some embodiments, the computing device may correlate the location of the object or objects of interest in the environment (determined by a SLAM operation) with a user action or behavior. In such embodiments, the trigger event may include detecting an occurrence of user action or behavior indicative or suggestive that the user should be reminded or directed to an object or objects of interest. For example, using a machine learning algorithm, the computing device may correlate a location of a TV remote control with a user behavior of sitting down in front of a television. In response to detecting or determining that the user has sat down in front of the television, the computing device may present the location of the TV remote via an output device (e.g., a display, a speaker, etc.) of the computing device.

In some embodiments, the computing device may correlate one or more objects of interest with a user action or behavior and inform the user about the location of one or more of the objects in the environment (determined by a SLAM operation) if such objects are not with or near the user. In such embodiments, the trigger event may include detecting a user an object, determine whether the location of the object as determined by SLAM and the user are in separate locations, and if so, display and/or sound a reminder informing the user where to find the correlated objects of interest. As an example, the computing device may correlate a user behavior of approaching the user's vehicle with keys for the vehicle, and determine the location of the keys for the vehicle in response to the user approaching the vehicle. In response to determining or detecting that the user is approaching the vehicle but the keys are in a different location, the computing device may display the location of the vehicle keys to the user via an output device (e.g., images presented on smart-glasses).

In some embodiments, the computing device may correlate a user behavior to a plurality of objects, all of which the user typically uses together while performing the behavior. For example, the computing device may correlate the user approaching the user's vehicle with possession by the user of car keys, a wallet and/or purse of the user, and corrective vision glasses, determine whether any of these correlated objects are not with the user, and display and/or sound a reminder informing the user about the location of any of the correlated objects that is not with the user. As an example, the computing device may correlate a user behavior of approaching the user's motorcycle with a motorcycle key chain, the user's helmet, and the user's driving jacket, determine whether any of these correlated objects are not with the user, and display and/or sound a reminder informing the user about the location of any of these correlated objects that is not with the user.

In some embodiments, the trigger event may include a time trigger or a date trigger. In various embodiments, the computing device may determine a correlation between a time trigger and/or a date trigger and an object or objects of interest by using a machine learning algorithm, based on user input, or another suitable input or indication to determine such a correlation. For example, the computing device may correlate a time (e.g., 7:30 AM) with one or more objects of interest (e.g., a briefcase, a smartphone, car keys, etc.), such as objects that a user may typically take to work at that time. In some embodiments, in response to the time trigger, the computing device may present the location of the object(s) of interest. As another example, the computing device may correlate a date (e.g., a person's birthday) with an object or objects of interest (such as a present purchased for the person's birthday). In some embodiments, in response to the date trigger, the computing device may display the location of the object(s) of interest to the user via an output device (e.g., images presented on smart-glasses).

In some embodiments, the computing device may correlate an object or objects of interest with a plurality of context information (such as a user behavior or action), and a time of day, a date, weather information, and/or the like. In such embodiments, the computing device may correlate different objects of interest with various user behaviors or actions at various times, dates, environmental conditions, etc. For example, the computing device may correlate a briefcase with a user action of approaching the user's vehicle at 7:30 AM on a weekday, and recognize a trigger event to present the location of the briefcase in response to detecting the user approaching the vehicle in conjunction with the time being approximately 7:30 AM. As another example, the computing device may correlate a tennis racket with a user action of approaching the user's vehicle (i.e., a similar user action) at 2:00 PM on a Sunday (i.e., a different day and/or time), and recognize a trigger event to present the location of the tennis racket in response to detecting the user approaching the vehicle in conjunction with the time being approximately 2:00 PM on a Sunday. As another example, the computing device may correlate a location of an umbrella with a time and a date (e.g., 7:00 AM on a weekday) and a weather condition (e.g., rain), and recognize a trigger event to present the location of the umbrella in response to the time approaching 7:00 AM on a weekday in conjunction with the correlated weather condition (e.g., rain). In various embodiments, the computing device may receive information to perform such correlations from, for example, a network element, server, etc. As mentioned above, in some embodiments, the computing device may correlate a plurality of objects with a given user behavior at or under particular times, dates, environmental conditions, and recognize a triggering event in response to the location of any of the correlated objects differing from the user's location at the correlated time, date and/or environmental condition. For example, the computing device may correlate a location of the user's briefcase, car keys, and reading glasses with the user approaching the user's vehicle at 7:30 AM on a weekday, so that the computing device recognizes a trigger event to present a location reminder if any of these objects are not with the user when the user approaches the vehicle at the correlated time.

In some embodiments, the computing device may operate as part of a system including a plurality of computing devices configured to provide and/or obtain updated locations of objects of interest. For example, two or more computing devices operating in an environment may communicate with each other to provide updated location information for object or objects of interest. As another example, computing devices may communicate with a local network device (e.g., a local server), a remote network device (e.g., a cloud server), or another suitable device, to provide updated locations of objects of interest. In this manner, in some embodiments, a computing device may receive an indication from another (a second) computing device that an object or objects of interest has been relocated to a second location in the environment. In various embodiments, the indication that the object or objects of interest has been relocated to a second location in the environment may be communicated directly to the first computing device by the second computing device, or via an intermediary device, such as a network device, server, etc. The first computing device may present the second location of the object or objects of interest in the map generated by the first SLAM operation in response to a trigger event.

For example, a first computing device may determine that a first user put her car keys (designated as an object or objects of interest) down in a first location in the user's house. Later, a second computing device (e.g., operated or worn by a second user) performing SLAM operations to map rooms in the house may recognize the car keys and, in identify the location of the car keys in the map, determine that the car keys have been moved to a second location (e.g., the second user picked up and moved the keys). In response to determining the occurrence of a trigger event (e.g., a time trigger, such as 7:30 AM), the first computing device may query a map database accessible to both the first and second computing to determine the current location of the car keys, and then display the second location (i.e., the current location or the last-known location) of the car keys (the object or objects of interest) in the map generated by the SLAM operations. In various embodiments, the first computing device may receive an indication that the object or objects of interest has been relocated to the second location in the environment via a "push" operation, a "pull" operation (e.g., in response to a request for the location of the object or objects of interest), or another suitable operation.

Some embodiments may enable a function by which a computing device is not authorized to disclose a location of an object or objects of interest, such as for privacy purposes, to enable parental controls, and other suitable functions. For example, a parent may hide an object from a child, such as a TV remote, candy, etc. As another example, a roommate may desire to make the location of certain objects unobtainable by another roommate. As another example, a worker may wish to distinguish personal items (for which the location is unobtainable by coworkers) from items for work (for which the location is obtainable by coworkers). In such embodiments, the computing device and/or a network element may store an indication that another computing device is not authorized to disclose the location of the object or objects of interest. Based on such an indication, a computing device may be prevented from obtaining the location of the object and/or prevented from disclosing the location of the object. In some embodiments, in response to the occurrence of a trigger event (e.g., a request to locate the object or objects of interest), a computing device may determine whether the computing devices authorized to disclose the location of the object or objects of interest, and present the location of the object or objects of interest within the map generated by the first SLAM operation in response to determining that the computing device is authorized to disclose the location of the object or objects of interest, the computing device may. In response to determining that the computing device is not authorized to disclose the location of the object or objects of interest, the computing device may present an indication that the computing device is not authorized to disclose the location of the object or objects of interest.

As an example of an implementation of various embodiments, a user may initialize his computing device (e.g., an HMD) to recognize an object or objects of interest (e.g., car keys, wallet, etc.) in video images captured by a camera on the computing device. The computing device may use a trained machine learning model to learn to recognize the object or objects of interest. The computing device may perform SLAM operations to localize the computing device in the environment (e.g., within a room), and to locate the object or objects of interest in environment as determined by SLAM operations. In some embodiments, the computing device may assign coordinates to the object or objects of interest (e.g., within a map generated by the first SLAM operation). The computing device may store the assigned coordinates in memory, and may use the assigned coordinates to support locating the object or objects of interest in the future. The memory may be within the computing device and/or may be a remote memory (e.g., in a remote server) accessible by the computing device. In some embodiments, the computing device may reduce an amount of information stored by saving an image of the object or objects of interest (or a frame containing the image) and its last known coordinates, rather than storing numerous images or large video data files. In response to a trigger event or a user request for the location of the object or objects of interest, the computing device may present the location of the object or objects of interest using, for example, the stored coordinates within the SLAM-generated map, such as displaying an image or indicator of the object or objects of interest in a head-mounted display of the SLAM-generated map.

As another example of an implementation of various embodiments, a user's computing device (e.g., an TIMD) may learn (e.g., by the operations of a machine learning algorithm) objects that the user typically carries or travels with, such as a laptop bag, jacket, keys, wallet, smartphone, etc. In some aspects, the computing device may correlate these objects and one or more user activities, such as leaving home, leaving work, etc., and/or an approximate or precise time of day (e.g., morning, afternoon, 7:30 AM, 6:00 PM, etc.). In some implementations, the computing device may provide a reminder via a display device, a speaker, and/or the like, such as "did you forget your car keys?" or "your car keys are on the kitchen counter next to the plant."

As another example of an implementation of various embodiments, a user's computing device may recognize that the user has left a restaurant without his credit card. In some embodiments, the computing device may generate a map of the environment around the computing device (e.g., the restaurant) by a first SLAM operation using information received from the computing device's optical sensor. Using information received from the optical sensor, the computing device may identify the credit card (an object or objects of interest) in the environment by an object recognition operation. By performing a second SLAM operation, the computing device may determine the location of the credit card (e.g., on the table next to a receipt for dinner). The computing device may determine a trigger event, such as approaching the user's vehicle, leaving the restaurant, moving a threshold distance away from the credit card, and/or the like. In response to the trigger event, the computing device may present the location of the credit card on the table back at the restaurant.

As another example of an implementation of various embodiments, a user's computing device may receive an input from a user setting a reminder for an object or objects of interest corresponding with a trigger event (e.g., a time trigger, an action such as the user leaving a location, etc.). For example, the computing device may receive an input setting a reminder such as "don't forget the coupons for the grocery store trip at 3:00 PM." The computing device may generate a map of the environment around the computing device by first SLAM operation (or may use an already-generated SLAM map), may identify the object or objects of interest (in this case, the coupons) using information received from the computing device's optical sensor, and may determine a location of the object or objects of interest in the environment, such as in a second SLAM operation. In response to a trigger event (e.g., 3:00 PM, leaving the house, approaching the vehicle, etc.), the computing device may present the location of the object or objects of interest in the environment (e.g., the location of the coupons).

Various embodiments improve the utility and effectiveness of operations of computing devices by enabling computing devices to utilize SLAM operations to generate maps of an environment around the computing device and locate objects of interest in the environment. Various embodiments further improve the utility and effectiveness of operation of computing devices by enabling computing devices determine the occurrence of a trigger event and present the location of objects of interest in response to the trigger event.

FIG. 1 is a system block diagram illustrating an example communications system 100 suitable for implementing various embodiments. The communication system 100 may include a computing device 102, a base station 104, an access point 106, a communication network 108, and a network element 110. In some embodiments, the computing device 102 may be equipped with an optical sensor 102a, such as a camera or another suitable device. In some embodiments, the communication system 100 also may include a second computing device 140.

The base station 104 and the access point 106 may provide wireless communications to access the communication network 108 over a wired and/or wireless communication backhaul 116 and 118, respectively. The base station 104 may include base stations configured to provide wireless communications over a wide area (e.g., macro cells), as well as small cells, which may include a micro cell, a femto cell, a pico cell, and other similar network access points. The access point 106 may include access points configured to provide wireless communications over a relatively smaller area. Other examples of base stations and access points are also possible.

The computing device 102 may communicate with the base station 104 over a wireless communication link 112a, and with the access point 106 over a wireless communication link 114a. The computing device 140 may communicate with the base station 104 over a wireless communication link 112b, and with the access point 106 over a wireless communication link 114b. The computing devices 102 and 104 may communicate with each other over a wireless communication link 115. The wireless communication links 112a, 112b, 114a, 114b, 115 may include a plurality of carrier signals, frequencies, or frequency bands, each of which may include a plurality of logical channels. The wireless communication links 112a, 112b, 114a, 114b, 115 may utilize one or more radio access technologies (RATs). Examples of RATs that may be used in a wireless communication link in various embodiments include medium range protocols such as Wi-Fi, LTE-U, LTE-Direct, LAA, MuLTEfire, and relatively short range RATs such as ZIGBEE®, BLUETOOTH®, and BLUETOOTH LOW ENERGY™ (LE). However, such examples should not be considered limiting. For example, embodiments are also possible in which a wireless communication link uses other RATs, such as 3GPP Long Term Evolution (LTE), 3G, 4G, 5G, Global System for Mobility (GSM), Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs.

The network element 110 may include a network server or another similar network element. The network element 110 may communicate with the communication network 108 over a communication link 122. The computing device 102 and the network element 110 may communicate via the communication network 108. The network element 110 may provide the computing device 102 with information, instructions, or commands relevant to operations of the computing device 102. In some embodiments, the network element 110 may store the data structure, such as a database, including location information of one or more objects of interest.

In various embodiments, the computing device 102 may move in an environment 120. In some embodiments, the computing device 102 may be configured to perform SLAM operations to localize the computing device 102 in the environment 120. In some embodiments, the computing device 102 may perform a SLAM operation using information received from the optical sensor 102a to generate a map of the environment 120. In some embodiments, the computing device 102 may identify features of the environment 120 around the computing device from the information received from the optical sensor 102a and may determine a position of the identified features to generate a map of the environment 120 using SLAM operations. In some embodiments, using information received from the optical sensor 102a, the computing device 102 may perform object recognition operations to identify an object or objects of interest in the environment by an, such as objects of interest 122 (e.g., keys), 124 (e.g., a briefcase), 126 (e.g., a gift), 128 (e.g., an ID badge), and 130 (e.g., a TV remote). In some embodiments, the computing device may determine a location of one or more of the objects of interest 122-130 by second SLAM operation. In some embodiments, the computing device may identify the object(s) of interest 122-130 while identifying the features of the environment around the computing device 120 from the information received from the optical sensor 120a and determining the positions of the identified features to generate the map using SLAM operations. In some embodiments, the computing device may generate the map in the form of plurality of grids or mesh points, and may determine and store locations of objects of interest 122, 124, 126, 128, 130 in terms of the grid or mesh point where the objects are located or can be found. Further operations, aspects, and implementations regarding the computing device 102 are described below.

Figure 2:
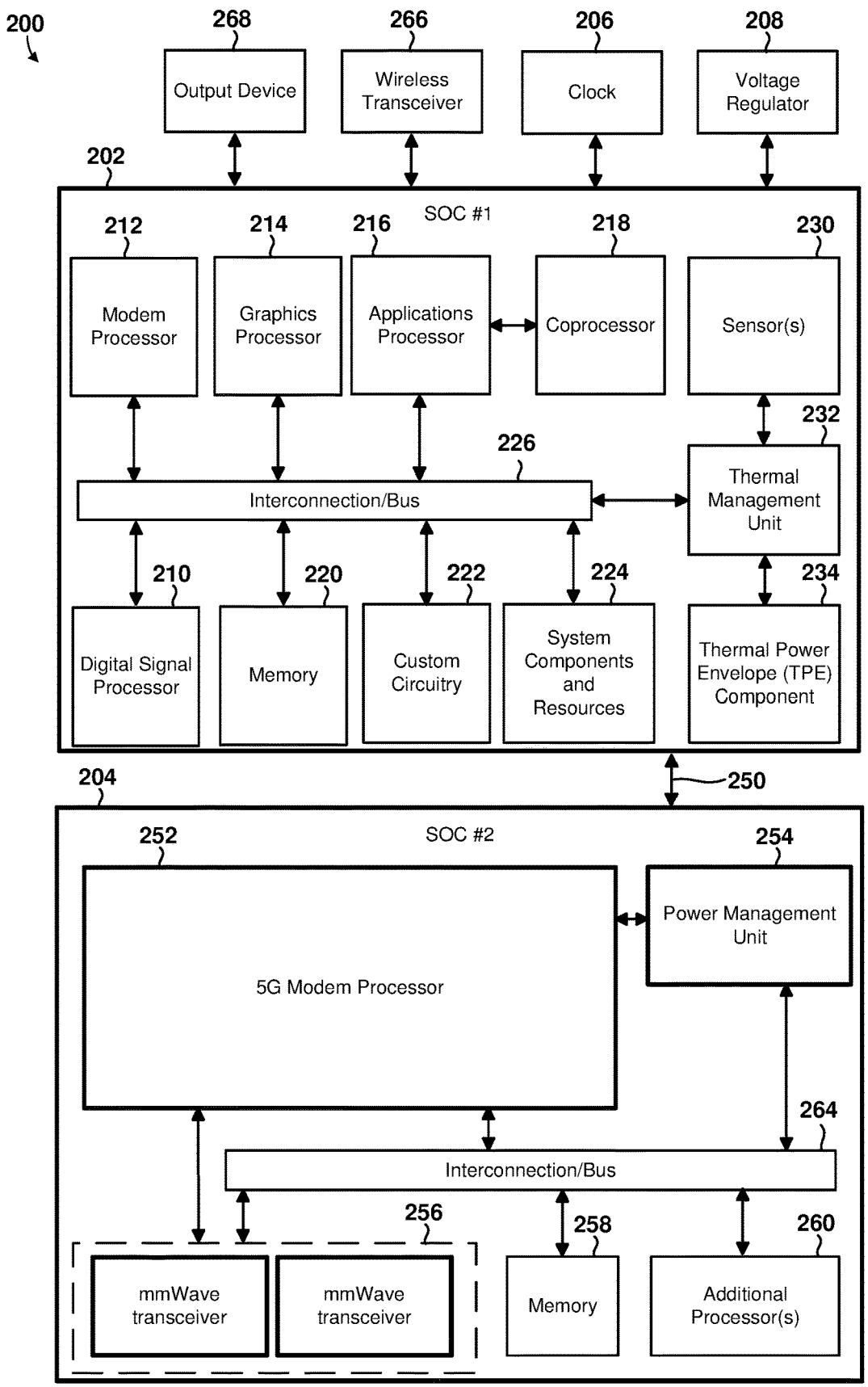
FIG. 2 is a component block diagram illustrating an example processing system including a wireless modem suitable for implementing various embodiments.

FIG. 2 is a component block diagram illustrating an example computing system 200 including a wireless modem suitable for implementing various embodiments. With reference to FIGS. 1 and 2, the illustrated example processing system 200 includes two SOCs 202, 204, a clock 206, a voltage regulator 208, a wireless transceiver 266, and a an output device 268 such as a display device, a sound output device (e.g., a speaker), a haptic feedback device, etc. In some embodiments, the first SOC 202 operates as central processing unit (CPU) of the wireless device that carries out the instructions of software application programs by performing the arithmetic, logical, control and input/output (I/O) operations specified by the instructions. In some embodiments, the second SOC 204 may operate as a specialized processing unit. For example, the second SOC 204 may operate as a specialized 5G processing unit responsible for managing high volume, high speed (e.g., 5 Gbps, etc.), and/or very high frequency short wave length (e.g., 28 GHz millimeter wave (mmWave) spectrum, etc.) communications.

The first SOC 202 may include a digital signal processor (DSP) 210, a modem processor 212, a graphics processor 214, an application processor 216, one or more coprocessors 218 (e.g., vector co-processor) connected to one or more of the processors, memory 220, custom circuitry 222, system components and resources 224, an interconnection/bus module 226, one or more sensors 230 (e.g., thermal sensors, motion sensors, proximity sensors, a multimeter, etc.), a thermal management unit 232, and a thermal power envelope (TPE) component 234. The second SOC 204 may include a 5G modem processor 252, a power management unit 254, an interconnection/bus module 264, memory 258, and various additional processors 260, such as an applications processor, packet processor, etc. The second SOC 204 may further be coupled to a plurality of mmWave transceivers 256, which may be separate integrated circuits that are radio frequency shielded on or packaged separate from the second SOC 204 as indicated by the dashed line.

Each processor 210, 212, 214, 216, 218, 252, 260 may include one or more cores, and each processor/core may perform operations independent of the other processors/cores. For example, the first SOC 202 may include a processor that executes a first type of operating system (e.g., FREEBSD™, LINUX®, OS X®, etc.) and a processor that executes a second type of operating system (e.g., MICROSOFT WINDOWS 10®). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 and/or custom circuitry 222 may also include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206 and a voltage regulator 208. Resources external to the SOC (e.g., clock 206, voltage regulator 208) may be shared by two or more of the internal SOC processors/cores.

In addition to the example processing system 200 discussed above, various embodiments may be implemented in a wide variety of computing systems, which may include a single processor, multiple processors, multicore processors, or any combination thereof. In some embodiments, only one SOC (e.g., 202, 204) may be used in a less capable computing device that are configured to provide sensor information to a more capable computing device, such as a computing device 102, 140.

Figure 3:
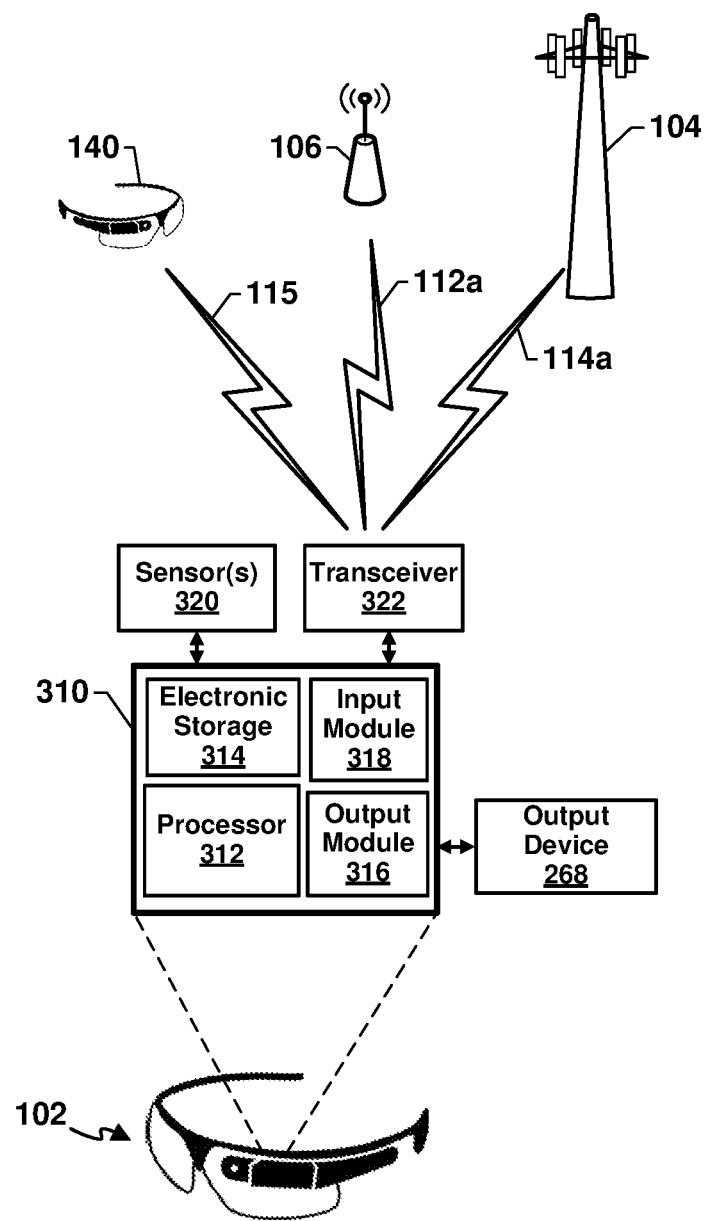
FIG. 3 is a component block diagram illustrating a processing device suitable for use in computing devices implementing various embodiments.

FIG. 3 is a component block diagram illustrating a processing device 310 suitable for use in a head mounted display computing device (e.g., smart glasses) s implementing various embodiments. With reference to FIGS. 1-3, the computing device 102 may include a control unit 310. The control unit 310 may include various circuits, devices, and/or functions used to control operations thereof. For example, the control unit 310 may include a processor 312, electronic storage 314 (i.e., memory), an input module 318, and an output module 316. In addition, the control unit 310 may be coupled to a transceiver 322 for transmitting and/or receiving wireless communications (e.g., with base station 104, access point 106, and/or a computing device 140 via communication links 112a, 114a, 115, as described), one or more sensors 320 (e.g., camera 102a), and an output device 268 such as a display device, a sound output device (e.g., a speaker), a haptic feedback device, etc.

The processing device 310 may be configured to receive information from an optical sensor (e.g., 102a, 320) and generate a map of an environment around the computing device by a first simultaneous location and mapping (SLAM) operation using information received from the optical sensor. The processing device 320 may be configured to identify an object or objects of interest in the environment of the computing device by an object recognition operation using information received from the optical sensor. The processing device 320 may be configured to determine a location of the object or objects of interest in the environment, such as during the first SLAM operation or as part of a second SLAM operation. The processing device 320 may be configured to present the determined location of the object or objects of interest in the environment (e.g., via output module 316 to the output device 268) in response to a trigger event correlated to the object or objects of interest.

Figure 4:
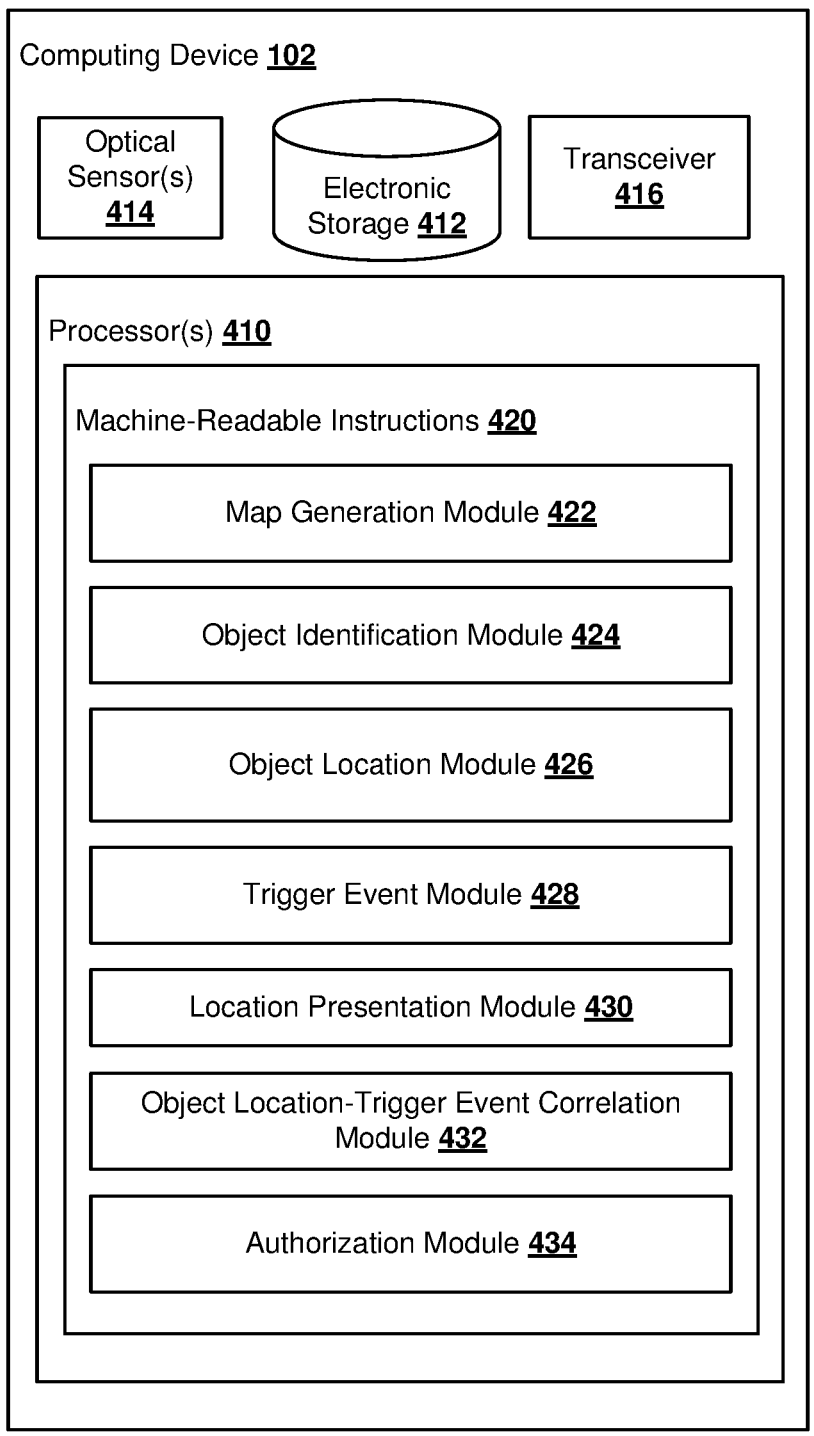
FIG. 4 is a component block diagram illustrating a system configured to provide a location of an object or objects of interest in accordance with various embodiments.
Figure 4:
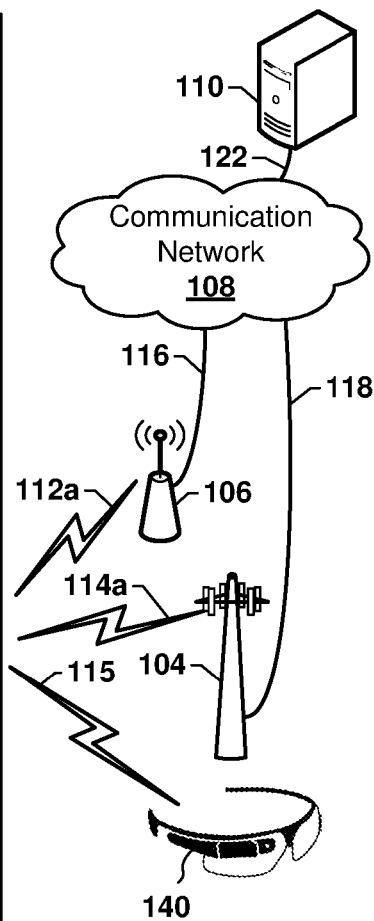

FIG. 4 is a component block diagram illustrating a system 400 configured to provide a location of an object or objects of interest in accordance with various embodiments. With reference to FIGS. 1-4, the system 400 may include a computing device 102, access point 106, base station 104, and/or computing device 120.

The computing device 102 may include one or more processors 410, electronic storage 412, one or more optical sensor(s) 414, a transceiver 416 (e.g., wireless transceiver), and other components. The computing device 102 may include a plurality of hardware, software, and/or firmware components operating together to provide the functionality attributed herein to the computing device 410.

Electronic storage 412 may include non-transitory storage media that electronically stores information. The electronic storage media of electronic storage 412 may include one or both of system storage that is provided integrally (i.e., substantially non-removable) with the computing device 102 and/or removable storage that is removably connectable to the computing device 102 via, for example, a port (e.g., a universal serial bus (USB) port, a firewire port, etc.) or a drive (e.g., a disk drive, etc.). In various embodiments, electronic storage 412 may include one or more of electrical charge-based storage media (e.g., EEPROM, RAM, etc.), solid-state storage media (e.g., flash drive, etc.), optically readable storage media (e.g., optical disks, etc.), magnetically readable storage media (e.g., magnetic tape, magnetic hard drive, floppy drive, etc.), and/or other electronically readable storage media. Electronic storage 412 may include one or more virtual storage resources (e.g., cloud storage, a virtual private network, and/or other virtual storage resources). Electronic storage 412 may store software algorithms, information determined by processor(s) 410, information received from the computing device 140, information received from network element 110, and/or other information that enables the computing device 102 to function as described herein.

Processor(s) 410 may include one of more local processors (e.g., 212, 214, 216, 218, 260, 312), which may be configured to provide information processing capabilities in the computing device 410. As such, processor(s) 410 may include one or more of a digital processor, an analog processor, a digital circuit designed to process information, an analog circuit designed to process information, a state machine, and/or other mechanisms for electronically processing information. Although processor(s) 410 is shown in FIG. 4 as a single entity, this is for illustrative purposes only. In some embodiments, processor(s) 410 may include a plurality of processing units. These processing units may be physically located within the same device, or processor(s) 410 may represent processing functionality of a plurality of devices operating in coordination.

The computing device 102 may be configured by machine-readable instructions 420, which may include one or more instruction modules. The instruction modules may include computer program modules. In various embodiments, the instruction modules may include one or more of a map generation module 422, an object identification module 424, an object location module 426, a trigger event module 428, a location presentation module 430, an object location-trigger event correlation module 432, and an authorization module 434.

The map generation module 422 may be configured to generate a map of an environment around the computing device by a first simultaneous location and mapping (SLAM) operation using information received from the optical sensor 414. The map generation module 422 may be configured to identify features of the environment around the computing device from the information received from the optical sensor and determining a position of the identified features. In some embodiments, the map generation module 422 may be configured to generate the map in the form of a grid of small volumes or in the form of mesh points. In some embodiments, the grid or mesh points making up the map may be correlated or registered relative to a recognizable feature in the environment (e.g., a door, wall, immovable furniture, etc.) that can be recognized in a second SLAM operation and used for aligning a second SLAM-generated map to the map generated in the first SLAM operation.

The object identification module 424 may be configured to identify an object or objects of interest in the environment of the computing device by an object recognition operation using information received from the optical sensor 414. The object identification module 424 may be configured to identify the object or objects of interest while identifying features of the environment around the computing device from the information received from the optical sensor and determining the position of the identified features to generate the map using SLAM operations. The object identification module 424 may be configured to execute a trained neural network configured to provide as an output identifications of objects of interest.

The object location module 426 may be configured to determine locations of the object or objects of interest in the environment. The object location module 426 may determine locations of the object or objects of interest during the first SLAM operation and/or during a second SLAM operation. The object location module 426 may be configured to assign to the object or objects of interest coordinates within the map generated by the first SLAM operation. In some embodiments, the object location module 426 may be configured to identify and store locations in the environment of the object or objects of interest in the form of grid or mesh point locations or coordinates. The object location module 426 may be configured to determine a location in the environment of the object or objects of interest provided as output by the trained neural network, such as during a SLAM operation. The object location module 426 may be configured to receive an indication from a second computing device that the object or objects of interest has/have been relocated to a second location in the environment, such as in the form of grid or mesh point locations or coordinates within a SLAM-generated map.

The trigger event module 428 may be configured to identify or recognize the occurrence of a trigger event correlated to the object or objects of interest. As described, the trigger event module 428 may be configured to identify or recognize trigger events in the form of user inputs (e.g., a query for the location of an object), or recognized situations or user behaviors in which a user may appreciate receiving a reminder about the location of one or more objects of interest. For example, the trigger event module 428 may be configured to identify or recognize the occurrence of a trigger event based on correlations of objects of interest with a user action or behavior determined by the object location-trigger event correlation module 432 as described herein.

The location presentation module 430 may be configured to present the determined location of the object or objects of interest in the environment in response to a trigger event correlated to the object or objects of interest. In some embodiments, the location presentation module 430 may be configured to present the determined location of the object or objects of interest in the form of highlights or encircled regions within the viewable environment based on a head-mounted display that overlays the SLAM-generated map with the viewable environment. In some embodiments, the location presentation module 430 may be configured to present the determined location of the object or objects of interest in the form of identified or highlighted grid or mesh point locations within the SLAM-generated map. In some embodiments, the location presentation module 430 may be configured to generate a navigation path from the current location of the computing device to the location of the object or objects of interest within the map generated by the first SLAM operation. In some embodiments, the location presentation module 430 may be configured to display an indication (e.g., an arrow) on a display of the computing device of the direction from the computing device to the location of the object or objects of interest. In some embodiments, the location presentation module 430 may be configured to display or otherwise inform the user of the computing device of a distance from the computing device to the determined location of the object or objects of interest.

The object location-trigger event correlation module 432 may be configured to correlate the location of objects of interest in the environment with user actions or behaviors. The object location-trigger event correlation module 432 may be configured to detect an occurrence of the user action or behavior, and determine whether a trigger event should be generated based on a location or locations of an object or objects of interest correlated to the detected user action or behavior. For example, in response to determining that the location or locations of an object or objects of interest correlated to the detected user action or behavior differs from the user's location, the object location-trigger event correlation module 432 may generate an object location-triggered event, such as by sharing information with the trigger event module 428.

The authorization module 434 may be configured to determine (e.g., in response to a trigger event) whether the computing device is authorized to disclose the location of the object or objects of interest (which, in various embodiments, may be a first location, a second location, etc. of the object or objects of interest). The authorization module 434 may be configured to enable the location presentation module 430 to present the location of the object or objects of interest in response to determining that the computing device is authorized to disclose the location of the object or objects of interest. The authorization module 434 may be configured to enable the location presentation module 432 present an indication that the computing device is not authorized to disclose the location of the object or objects of interest in response to determining that the computing device is not authorized to disclose the location of the object or objects of interest.

The processor(s) 410 may be configured to execute the modules 422-434 and/or other modules by software, hardware, firmware, some combination of software, hardware, and/or firmware, and/or other mechanisms for configuring processing capabilities on processor(s) 410.

The description of the functionality provided by the different modules 422-434 is for illustrative purposes, and is not intended to be limiting, as any of modules 422-434 may provide more or less functionality than is described. For example, one or more of modules 422-434 may be eliminated, and some or all of its functionality may be provided by other ones of modules 422-434. As another example, processor(s) 410 may be configured to execute one or more additional modules that may perform some or all of the functionality attributed below to one of modules 422-434.

Figure 5A:
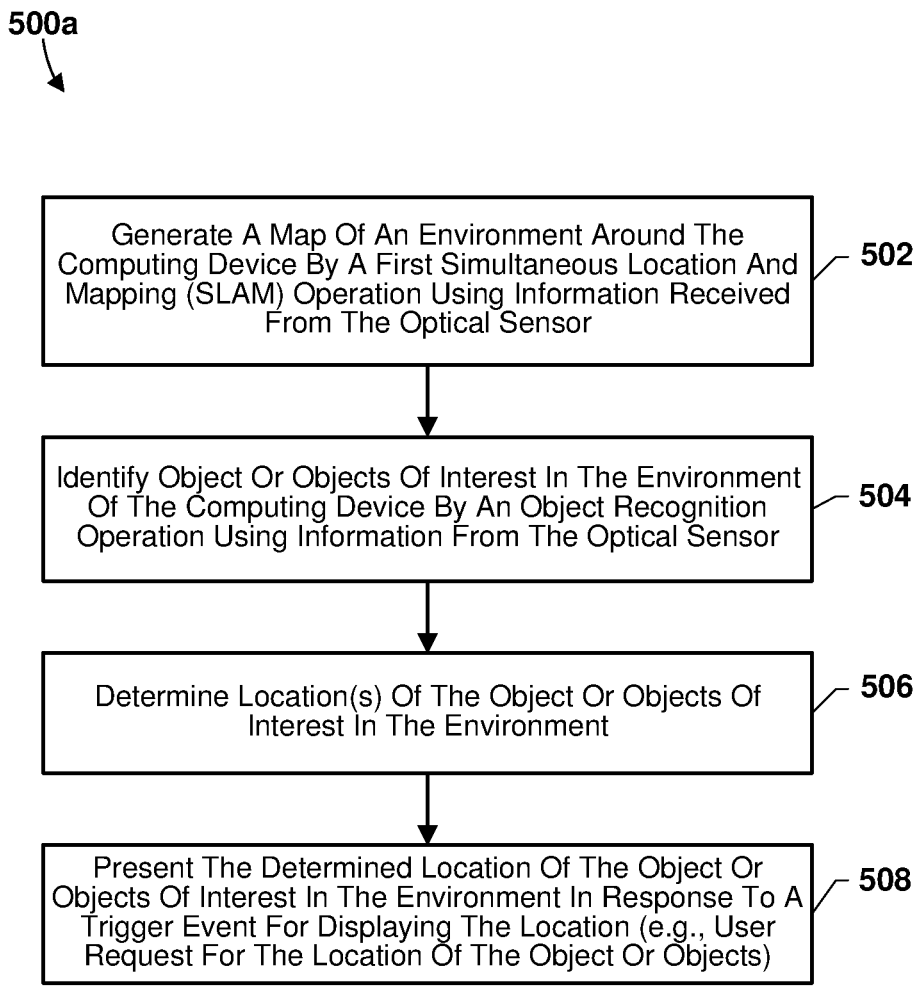
FIG. 5A is a process flow diagram illustrating an example method 500a that may be performed by a processing device of a computing device for providing a location of an object or objects of interest according to various embodiments.

FIG. 5A is a process flow diagram illustrating an example method 500a that may be performed by a processing device of a computing device for providing a location of an object or objects of interest according to various embodiments. With reference to FIGS. 1-5A, means for performing each of the operations of the method 500a may be a processor (e.g., 210, 212, 214, 216, 218, 260, 312, 410) of the computing device (e.g., 102) and/or the like.

In block 502, the processor may generate a map of an environment around the computing device by a first SLAM operation using image information received from the optical sensor. In some embodiments, the processor may perform the SLAM operation to identify features of the environment around the computing device from the information received from the optical sensor to generate the SLAM-generated map based on the determine a position of the identified features. In some embodiments, the generated map may be in the form (or include features) of a plurality of two-dimensional (2D) or three-dimensional (3D) grids or mesh points, which may be saved in memory and usable for identifying locations of objects of interest. Means for performing the operations of block 502 may include the processor (e.g., 210, 212, 214, 216, 218, 260, 312, 410), the optical sensor (e.g., 102a, 320, 414), and the map generation module 422.

In block 504, the processor may identify an object or objects of interest in the environment of the computing device by an object recognition operation using information received from the optical sensor. In some embodiments, the processor may identify the object or objects of interest while identifying features of the environment around the computing device from the information received from the optical sensor and determining positions of the identified features as part of the operations of generating the map using SLAM techniques. In some embodiments, the processor may provide an output indicating the identification of one or more objects of interest (e.g., highlighting the object or objects of interest in a display device, drawing a rectangle or circle around of the object or objects of interest, and the like).

In some embodiments, the processor may process images of the environment using a trained neural network that is configured to provide as an output identifications of objects of interest. In some embodiments, the processor may apply image(s) of objects identified while scanning the environment to a trained neural network configured to provide as an output identifications of objects of interest. Thus, in some embodiments, the operations of identifying an object or objects of interest in block 504 may be performed or accomplished as part of or simultaneous with the operations of scanning the environment to generate the map based on recognized features in block 502. In some embodiments, the processor may determine a location in the environment of the object or objects of interest provided as output by the trained neural network during a second SLAM operation (e.g., a second SLAM operation to locate objects of interest within a map that was previously generated in a first SLAM operation).

Means for performing the operations of block 504 may include the processor (e.g., 210, 212, 214, 216, 218, 260, 312, 410), the output module 316, the output device 268, and the object identification module 424.

In block 506, the processor may determine locations of the object or objects of interest in the environment based on the map and recognition of the object or objects of interest. In some embodiments or circumstances, the processor may determine locations of the object or objects of interest in the environment during the process of generating the map in the first SLAM operation. In some embodiments or circumstances, the processor may determine locations of the object or objects of interest in the environment during a second SLAM operation, such as when scanning the environment after the map has been generated in block 502 to locate objects of interest within the map. In some embodiments, the computing device may assign to the object or objects of interest coordinates within the map generated by the first SLAM operation (e.g., the operations performed by the computing device to generate the map of the environment around the computing device). In some embodiments, the computing device may locate objects of interest within the map generated by the first SLAM operation in terms of grid or mesh points within the map where the object or objects are located. In some embodiments, the coordinates of objects of interest within the SLAM-generated map may be in the form of a grid location or mesh points within the map. In some embodiments, the coordinates, grid location or mesh points of objects of interest (i.e., objects identified in block 504) may be stored in memory for using presenting the locations of such objects to a user in response to a trigger event. In some embodiments, the processor may store in memory one or more images of the identified object or objects of interest at the determined location of the object or objects of interest. Means for performing the operations of block 506 may include the processor (e.g., 210, 212, 214, 216, 218, 260, 312, 410) and the object location module 426.

In block 508, the processor may present the determined location or locations of the object or objects of interest in the environment in response to a trigger event for displaying the location of the object or objects of interest. As described herein, in various embodiments a trigger event for displaying the location of the object or objects of interest may be determined by the processor by any of receipt of a user input (e.g., a voice prompt, button push, touch screen interaction, etc.), recognition of a user behavior, action or location correlated to a specific object or objects of interest, recognition of a user behavior or action correlated to a specific object or objects of interest occurring in conjunction with another condition (e.g., time of day, day of week, weather conditions, etc.), and/or recognition of a user behavior, action or location correlated to a specific object or objects of interest (and optionally other conditions) and determination that one or more of the correlated objects of interest are not with the user. Means for performing the operations of block 508 may include the processor (e.g., 210, 212, 214, 216, 218, 260, 312, 410), the output module 316, the output device 268, the trigger event module 428, and the location presentation module 430.

In some embodiments, in block 508 the computing device may present an image of the object or objects of interest at the determined location, such as rendered on an augmented reality display presented on a head-mounted display (e.g., smart glasses) so that the image appears to the user at or in the direction of the object or objects of interest. In some embodiments, in block 508 the computing device may present a representation of the map generated using the first SLAM operation that includes an indication of the location of the object or objects of interest. In some embodiments, in block 508 the computing device may display a grid or mesh point on the map generated using the first SLAM operation where the object or objects of interest are located. In some embodiments, in block 508 the computing device may present via a sound output device an audible indication of the location of the object or objects of interest.

In some embodiments, in block 508 the computing device may generate a navigation path from the current location of the computing device to the location of the object or objects of interest within the map generated by the first SLAM operation. In some embodiments, the computing device may output the generated navigation path for user on a display device (e.g., as a map or navigation path), via a sound output device (e.g., as a step or series of steps to move from the computing device's current location to be location of the object or objects of interest), etc. In some embodiments, in block 508 the computing device may render on a display device of the computing device (e.g., display of smart glasses or an HMD) an indication, such as an arrow or similar pointing icon, of the direction from the computing device to the location of the object or objects of interest. In some embodiments, in block 508 the computing device may determine the distance to the location of the object or objects of interest from the location of the computing device, and present the distance to the user, such as in the form of a number and/or text presented on a display of the computing device (e.g., display of smart glasses or an HMD).

In some embodiments, in block 508 the trigger event may include an input received by the computing device requesting the location of the object or objects of interest. In some embodiments, such input may include a query, command, an instruction, etc. received by the computing device verbally, via a gestural command, or through any manner of input device. In some embodiments, in block 508 the trigger event may include a time or a date. In some embodiments, in block 508 the trigger event may include an observed behavior or user behavior.

In some embodiments, in block 508 the trigger event may be a location of the user that has been correlated to the object or objects of interest and recognition that user in possession of the computing device has satisfied the correlated user location condition. In some embodiments, the user location may be in the form of a boundary or geofence in which the trigger event is recognized when the user either leaves or enters the boundary or geofence. In some embodiments, the user location may be in the form of a distance to the object or objects of interest in which the trigger event is recognized when the user either comes within the distance or travels beyond the distance to the object or objects of interest. In some embodiments, the user location condition may be a detectable condition associated with a particular location, such as reception or strength of signals from a particular WiFi hotspot or router, a particular Bluetooth transceiver, a particular cell tower, etc. For example, a user may correlate house keys and a wallet or purse to a boundary or geofence around the user's house, and the computing device may display locations of the house keys and wallet or purse when the user approaches the boundary or geofence to help the user find those objects before leaving home. As another example, a user may correlate the user's hardhat with a boundary or geofence around a construction site, and display the location of the user's hardhat when the user approaches the boundary or geofence to help the user remember to wear the hard hat upon entering the construction site.

Figure 5B:
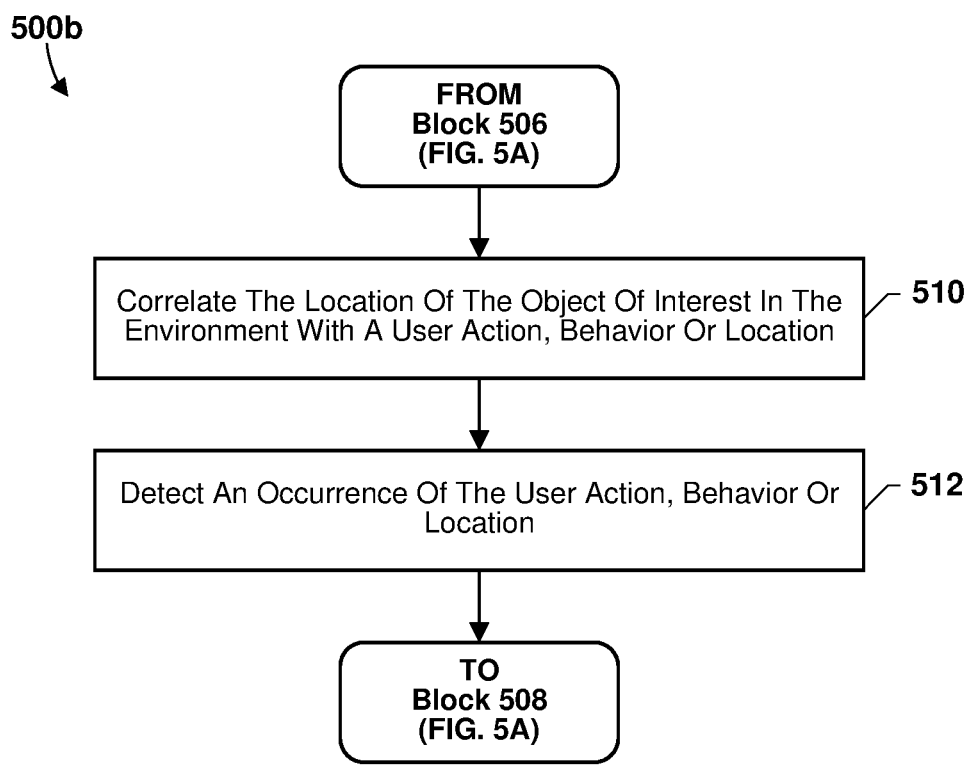
FIGS. 5B-5D are process flow diagrams illustrating operations that may be performed by a processing device of a computing device as part of the method for providing a location of an object or objects of interest according to various embodiments.
Figure 5C:
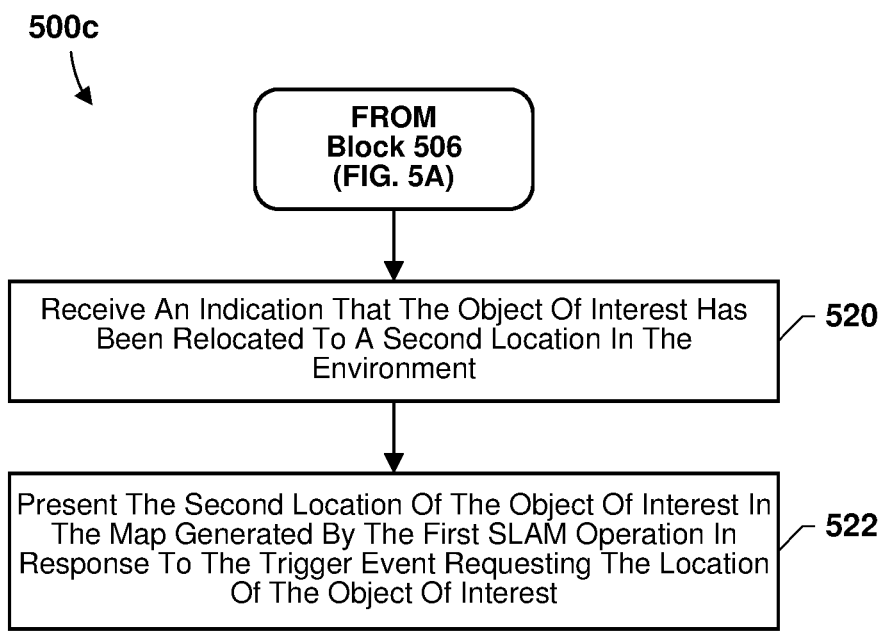
Figure 5D:
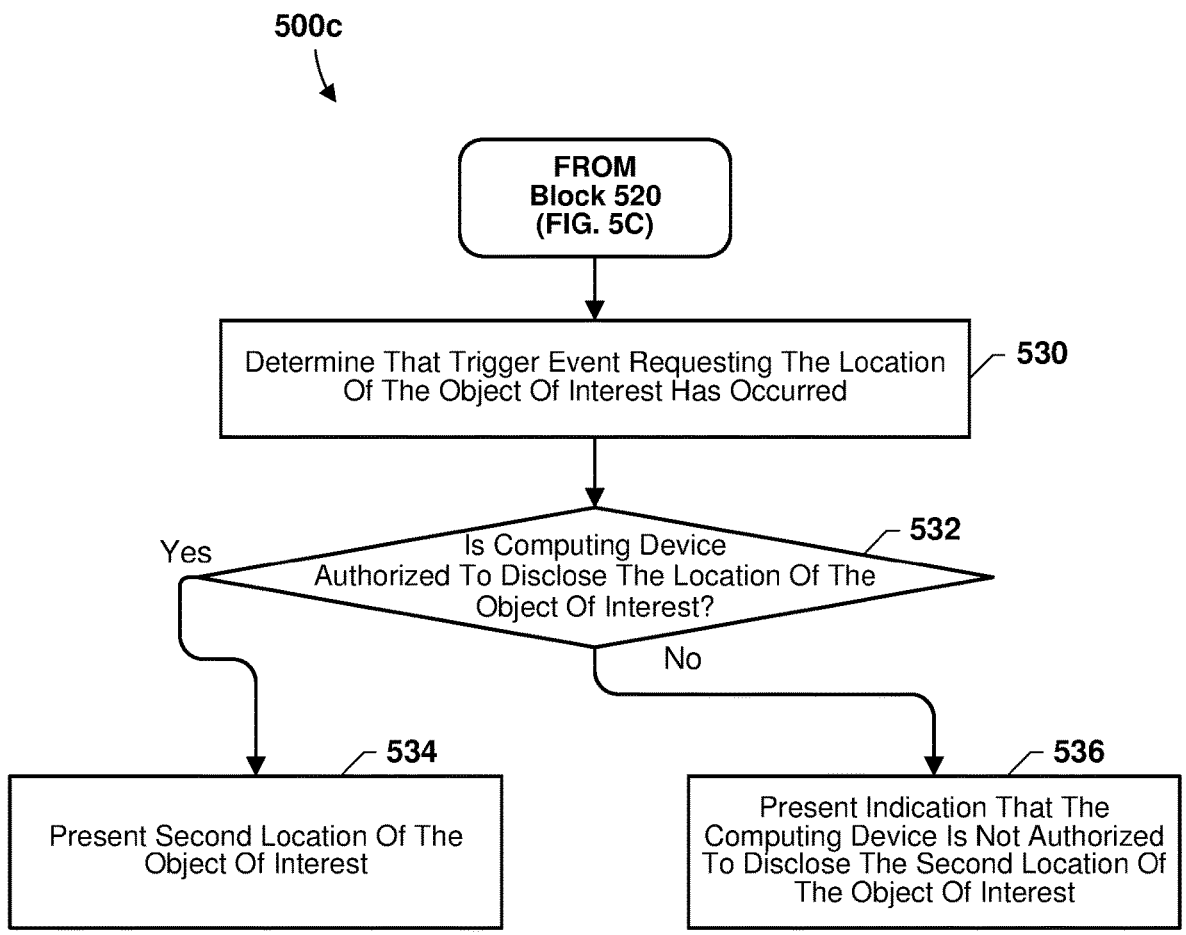

FIGS. 5B-5D are process flow diagrams illustrating operations 500b-500d that may be performed by a processing device of a computing device as part of the method 500a for providing a location of an object or objects of interest according to various embodiments. With reference to FIGS. 1-5D, means for performing the operations 500b-500d may be a processor (e.g., 210, 212, 214, 216, 218, 260, 312, 410) of the computing device (e.g., 102) and/or the like.

With reference to FIG. 5B, following determination of a location of the object or objects of interest in the environment in block 506 of the method 500, in operations 500b the processor may correlate the location of the object or objects of interest in the environment with a user action, a user behavior, or user location in block 510. For example, using a machine learning algorithm, the processor may correlate a location of a TV remote control with a user behavior of sitting down in front of a television. As another example, the computing device may correlate a user behavior of approaching the user's vehicle with a location of the keys for the vehicle.

In some embodiments, in block 510 the processor may determine or generate complex correlations of the object or objects of interest with user behavior, actions or location using a variety of information regarding current conditions relevant to a user's actions, behavior and/or location. In some embodiments, the processor may correlate an object or objects of interest with a user behavior, action and/or location as well as a time of day, and/or a date, and/or weather information, and/or other information. For example, the processor may correlate the user's briefcase, car keys, and reading glasses with the user approaching the user's vehicle at 7:30 AM on a weekday, so that the computing device can generate a location reminder if any of these objects are not with the user at that time.

In some embodiments, in block 510 the processor may correlate a location of the user with object or objects of interest. In some embodiments, the correlated user location may be in the form of a boundary or geofence around a certain location (e.g., the user's home, workplace, etc.). For example, objects (e.g., house keys, wallet, etc.) that the user should have when leaving a location (e.g., the user's home) may be correlated to a boundary or geofence around that location. As another example, objects that a user should have when entering a boundary or geofence around a certain location (e.g., the user's workplace, a construction site, etc.). In some embodiments, the correlated user location may be in the form of a distance to the object or objects of interest. For example, a user may correlate the user's smartphone to a particular distance to ensure the user remains within hearing distance of the smartphone. In some embodiments, the processor may correlate an object or objects of interest with a detectable condition associated with a particular location, such as reception or strength of signals from a particular WiFi hotspot or router, a particular Bluetooth transceiver, a particular cell tower, etc. For example, a user may correlate the user's smartphone with the user's home WiFi router (e.g., a minimum strength of the WiFi signal from the home router) to ensure the user is reminded about the location of the user's smartphone when approaching or moving beyond the user's WiFi network.

Means for performing the operations of block 510 may include the processor (e.g., 210, 212, 214, 216, 218, 260, 312, 410) and the object location-trigger event correlation module 432.

In block 512, the processor may detect an occurrence of a correlated user action, behavior or location. For example, the processor may detect the user behavior of sitting down in front of the television, approaching the user's vehicle, etc. In the case of complex correlations, the processor may detect an occurrence of a correlated user action or behavior at or in conjunction with occurrence of another correlated condition or conditions (e.g., time of day, day of week, weather conditions, etc.). In some embodiments, in block 512 the processor recognize when a correlated user location condition is satisfied. For example, if a location of the user has been correlated to the object or objects of interest, the processor may recognize and issue a trigger event when the user in possession of the computing device satisfies the correlated user location condition. In some embodiments, the user location condition may be in the form of a boundary or geofence in which the processor recognizes a trigger event when the user either leaves or enters the boundary or geofence. In some embodiments, the user location condition may be in the form of a distance to the object or objects of interest in which the processor recognizes a trigger event when the user either comes within the distance or travels beyond the distance to the object or objects of interest. In some embodiments, the user location condition may be a detectable condition associated with a particular location, such as reception or strength of signals from a particular WiFi hotspot or router, a particular Bluetooth transceiver, a particular cell tower, etc. For example, a user may correlate house keys and a wallet or purse to a boundary or geofence around the user's house, and in block 512 the processor may recognize when the user approaches the boundary or geofence, causing the computing device to display locations of the house keys and wallet or purse in block 508 to help the user find those objects before leaving home. As another example, a user may correlate the user's hardhat with a boundary or geofence around a construction site, and in block 512 the processor may recognize when the user approaches the boundary or geofence around the construction site, and display the location of the user's hardhat in block 508 to help the user remember to wear the hard hat upon entering the construction site. Means for performing the operations of block 512 may include the processor (e.g., 210, 212, 214, 216, 218, 260, 312, 410) and the trigger event module 428.

The processor then may present the determined location or locations of the object or objects of interest in the environment in response to a correlated trigger event in block 508 of the method 500 as described.

With reference to FIG. 5C, following the determination of the location or locations of the object or objects of interest in the environment in block 506 of the method 500, in operations 500c the processor may receive an indication that the object or objects of interest has/have been relocated to a second location in the environment in block 520. In some embodiments, the computing device may determine that the object or objects of interest has been relocated, such as part of or in response to another scan of the environment. In some embodiments, the computing device may receive information from the object or objects of interest indicating that the location of the object or objects of interest has been relocated, such as location information determined and transmitted by the object or objects (e.g., Global Positioning Information (GPS) information). In some embodiments, the computing device may receive the indication that the object or objects of interest has/have been relocated to a second location in the environment directly from a second computing device (e.g., from the second computing device 140 via communication link 115) or via an intermediary device (e.g., via network element 110). In some embodiments, the indication that the object or objects of interest has/have been relocated to a second location in the environment may be in the form of grid or mesh points within the map (e.g., generated in block 502) at or within which the object or objects of interest are now located. Means for performing the operations of block 520 may include the processor (e.g., 210, 212, 214, 216, 218, 260, 312, 410) and the object location module 426.

For example, a first computing device may determine that a first user put her car keys (designated as an object or objects of interest) down in a first location. Later, a second computing device (e.g., operated or worn by a second user) may determine that the car keys have been moved to a second location (e.g., the second user picked up and moved the keys). In some embodiments, the first computing device may receive the indication that the object or objects of interest has been relocated to the second location in the environment via a "push" operation (e.g., the computing device 140, or the network element 110, may send a location update to the computing device 102 from time to time, in response to determining that the object or objects of interest has been relocated to the second location, etc.). In some embodiments, the first computing device may receive the indication that the object or objects of interest has been relocated to the second location in the environment via a "pull" operation (e.g., the computing device 140, or the network element 110, may provide the indication that the object or objects of interest has been relocated to the second location in response to a request from the first computing device 102 for the location of the object or objects of interest).

In block 522, the processor may present the second location of the object or objects of interest in the map generated by the first SLAM operation in response to a trigger event. For example, in response to determining the occurrence of a trigger event (e.g., a time trigger, such as 7:30 AM), the first computing device may present the second location (i.e., the current location, or the last-known location) of the car keys (the object or objects of interest) in the map generated by the first SLAM operation. In some embodiments, the computing device may present the second location by displaying a grid or mesh point on the map generated using the first SLAM operation where the object or objects of interest are located. Means for performing the operations of block 522 may include the processor (e.g., 210, 212, 214, 216, 218, 260, 312, 410), the trigger event module 428, and the location presentation module 430.

With reference to FIG. 5D, following receipt of an indication from a second computing device that the object or objects of interest has been relocated to a second location in the environment in block 520 of the method 500, in operations 500d the processor may determine that a trigger event has occurred in block 530. As described herein, in various embodiments a trigger event for displaying the location of the object or objects of interest may be determined by the processor by any of receipt of a user input (e.g., a voice prompt, button push, touch screen interaction, etc.), recognition of a user behavior or action correlated to a specific object or objects of interest, recognition of a user behavior or action correlated to a specific object or objects of interest and to other conditions (e.g., time of day, day of week, weather conditions, etc.), and/or recognition of a user behavior or action correlated to a specific object or objects of interest (and optionally other conditions) and determination that one or more of the correlated objects of interest are not with the user. Means for performing the operations of block 520 may include the processor (e.g., 210, 212, 214, 216, 218, 260, 312, 410) and the trigger event module 428.

In determination block 532, the processor may determine whether the computing device is authorized to disclose the second location of the object or objects of interest. In some embodiments, the processor may determine whether an indication is stored in a memory of the computing device, in a memory of a network element (e.g., the network element 110), and/or the like indicating whether the computing devices authorized to disclose the second location of the object or objects of interest. Means for performing the operations of determination block 532 may include the processor (e.g., 210, 212, 214, 216, 218, 260, 312, 410) and the authorization module 434.

In response to determining that the computing device is authorized to disclose the location of the object or objects of interest (i.e., determination block 532="Yes"), the processor may present the second location of the object or objects of interest in block 534. As described with reference to block 508, the processor may present the second location of the object or objects of interest as an indication on a map generated by a first SLAM operation, as images of the object or objects rendered to align with the location on augmented reality display, and/or as a grid or mesh point on the map generated using the first SLAM operation where the object or objects of interest are located. Means for performing the operations of block 534 may include the processor (e.g., 210, 212, 214, 216, 218, 260, 312, 410), the output module 216, the output device 268, and the location presentation module 430.

In response to determining that the computing device is not authorized to disclose the location of the object or objects of interest (i.e., determination block 532="No"), the processor may present an indication that the computing device is not authorized to disclose the second location of the object or objects of interest in block 536. Means for performing the operations of block 534 may include the processor (e.g., 210, 212, 214, 216, 218, 260, 312, 410), the output module 216, the output device 268, and the location presentation module 430.

Figure 6:
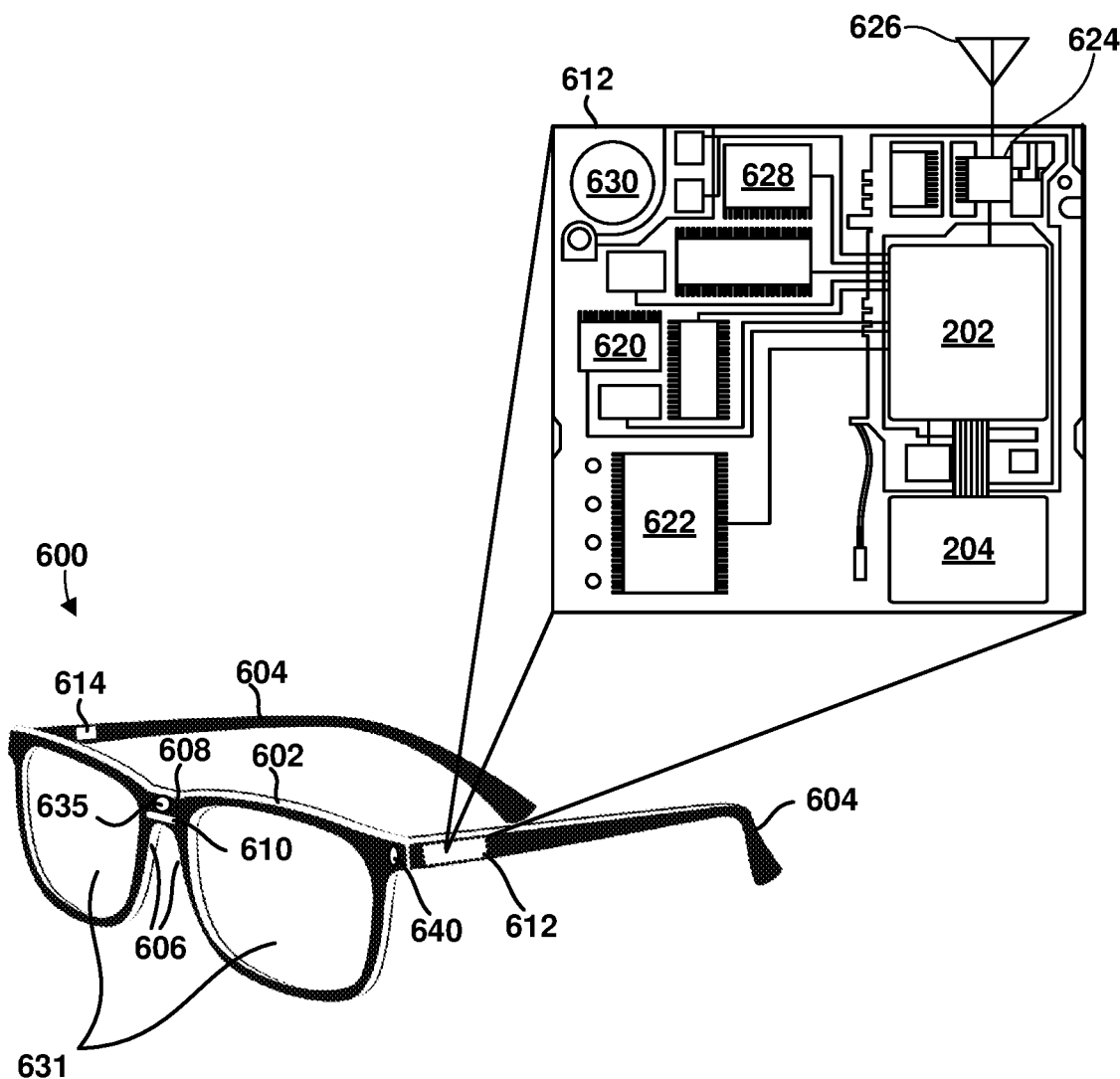
FIG. 6 is a component block diagram of a computing device suitable for use with various embodiments.

FIG. 6 is a component block diagram of a computing device suitable for use with various embodiments. With reference to FIGS. 1-6, various embodiments (including embodiments discussed above with reference to FIGS. 1-5D) may be implemented on a variety of computing devices, an example of which is illustrated in FIG. 6 in the form of smart glasses 600. The smart glasses 600 may operate like conventional eye glasses, but with enhanced computer features and sensors, like a built-in camera 635 and heads-up display or AR features on or near the lenses 631. Like any glasses, smart glasses 600 may include a frame 602 coupled to temples 604 that fit alongside the head and behind the ears of a wearer. The frame 602 holds the lenses 631 in place before the wearer's eyes when nose pads 606 on the bridge 608 rest on the wearer's nose.

In some embodiments, smart glasses 600 may include an image rendering device 614 (e.g., an image projector), which may be embedded in one or both temples 604 of the frame 602 and configured to project images onto the optical lenses 631. In some embodiments, the image rendering device 614 may include a light-emitting diode (LED) module, a light tunnel, a homogenizing lens, an optical display, a fold mirror, or other components well known projectors or head-mounted displays. In some embodiments (e.g., those in which the image rendering device 614 is not included or used), the optical lenses 631 may be, or may include, see-through or partially see-through electronic displays. In some embodiments, the optical lenses 631 include image-producing elements, such as see-through Organic Light-Emitting Diode (OLED) display elements or liquid crystal on silicon (LCOS) display elements. In some embodiments, the optical lenses 631 may include independent left-eye and right-eye display elements. In some embodiments, the optical lenses 631 may include or operate as a light guide for delivering light from the display elements to the eyes of a wearer.

The smart glasses 600 may include a number of external sensors that may be configured to obtain information about wearer actions and external conditions that may be useful for sensing images, sounds, muscle motions and other phenomenon that may be useful for detecting when the wearer is interacting with a virtual user interface as described. In some embodiments, smart glasses 600 may include a camera 635 configured to image objects in front of the wearer in still images or a video stream. Additionally, the smart glasses 600 may include a lidar sensor 640 or other ranging device. In some embodiments, the smart glasses 600 may include a microphone 610 positioned and configured to record sounds in the vicinity of the wearer. In some embodiments, multiple microphones may be positioned in different locations on the frame 602, such as on a distal end of the temples 604 near the jaw, to record sounds made when a user taps a selecting object on a hand, and the like. In some embodiments, smart glasses 600 may include pressure sensors, such on the nose pads 606, configured to sense facial movements for calibrating distance measurements. In some embodiments, smart glasses 600 may include other sensors (e.g., a thermometer, heart rate monitor, body temperature sensor, pulse oximeter, etc.) for collecting information pertaining to environment and/or user conditions that may be useful for recognizing an interaction by a user with a virtual user interface The smart glasses 600 may include a processing system 612 that includes processing and communication SOCs 202, 204 which may include one or more processors (e.g., 212, 214, 216, 218, 260, 312, 410) one or more of which may be configured with processor-executable instructions to perform operations of various embodiments. The processing and communications SOCs 202, 204 may be coupled to internal sensors 620, internal memory 622, and communication circuitry 624 coupled one or more antenna 626 for establishing a wireless data link (e.g., with base station 104, access point 106, or second computing device 140). The processing and communication SOCs 202, 204 may also be coupled to sensor interface circuitry 628 configured to control and received data from a camera 635, microphone(s) 610, and other sensors positioned on the frame 602.

The internal sensors 620 may include an inertial measurement unit (IMU) that includes electronic gyroscopes, accelerometers, and a magnetic compass configured to measure movements and orientation of the wearer's head. The internal sensors 620 may further include a magnetometer, an altimeter, an odometer, and an atmospheric pressure sensor, as well as other sensors useful for determining the orientation and motions of the smart glasses 600. The processing system 612 may further include a power source such as a rechargeable battery 630 coupled to the SOCs 202, 204 as well as the external sensors on the frame 602.

Figure 7:
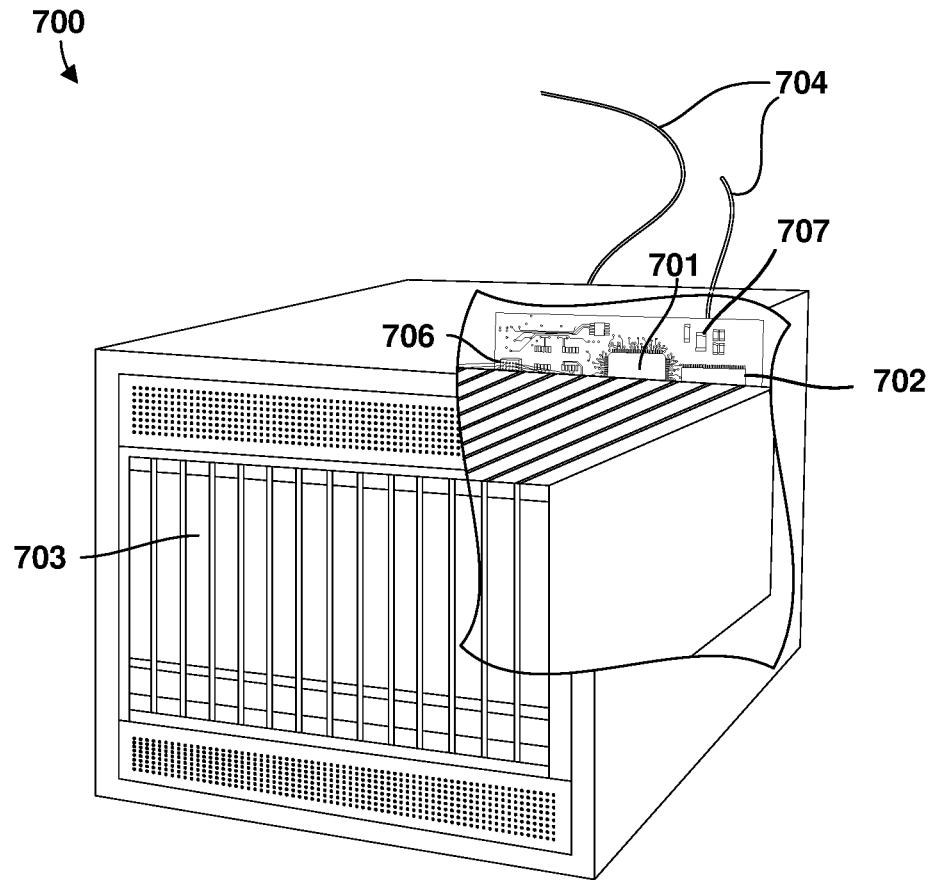
FIG. 7 is a component block diagram of a network computing device suitable for use with various embodiments.

FIG. 7 is a component block diagram of a network computing device suitable for use with various embodiments. With reference to FIGS. 1-7, various embodiments (including, but not limited to, embodiments discussed above with reference to FIGS. 1-5D) may be implemented on a variety of network computing devices, an example of which is illustrated in FIG. 7 in the form of a network computing device 700. The network computing device 700 may include a processor 701 coupled to volatile memory 702 and a large capacity nonvolatile memory, such as a disk drive 703. The network computing device 700 may also include a peripheral memory access device such as a floppy disc drive, compact disc (CD) or digital video disc (DVD) drive 706 coupled to the processor 701. The network computing device 700 may also include network access ports 704 (or interfaces) coupled to the processor 701 for establishing data connections with a network, such as the Internet and/or a local area network coupled to other system computers and servers. The network computing device 700 may include one or more transceivers 707 for sending and receiving electromagnetic radiation that may be connected to a wireless communication link. The network computing device 700 may include additional access ports, such as USB, Firewire, Thunderbolt, and the like for coupling to peripherals, external memory, or other devices.

The processors implementing various embodiments may be any programmable microprocessor, microcomputer or multiple processor chip or chips that can be configured by software instructions (applications) to perform a variety of functions, including the functions of the various embodiments described in this application. In some communication devices, multiple processors may be provided, such as one processor dedicated to wireless communication functions and one processor dedicated to running other applications. Typically, software applications may be stored in the internal memory before they are accessed and loaded into the processor. The processor may include internal memory sufficient to store the application software instructions.

Implementation examples are described in the following paragraphs. While some of the following implementation examples are described in terms of example methods, further example implementations may include: the example methods discussed in the following paragraphs implemented by a computing device comprising a processor configured with processor-executable instructions to perform operations of the methods of the following implementation examples; the example methods discussed in the following paragraphs implemented by a computing device comprising means for performing functions of the methods of the following implementation examples; and the example methods discussed in the following paragraphs may be implemented as a non-transitory processor-readable storage medium having stored thereon processor-executable instructions configured to cause a processor of a computing device to perform the operations of the methods of the following implementation examples.

Example 1. A method performed by a computing device configured with an optical sensor for providing a location of an object of interest, including: generating a map of an environment around the computing device by a first simultaneous location and mapping (SLAM) operation using information received from the optical sensor; identifying an object of interest in the environment of the computing device by an object recognition operation using information received from the optical sensor; determining a location of the object of interest in the environment; and presenting the determined location of the object of interest in the environment in response to a trigger event for displaying the location of the object of interest.

Example 2. The method of example 1, in which: generating the map of an environment around the computing device by the first SLAM operation using information received from an optical sensor of the computing device includes identifying features of the environment around the computing device from the information received from the optical sensor and determining a position of the identified features; and identifying an object of interest in the environment of the computing device by an object recognition operation using information received from the optical sensor includes identifying the object of interest while identifying features of the environment around the computing device from the information received from the optical sensor and determining the position of the identified features to generate the map.

Example 3. The method of any of examples 1-2, in which determining the location of the object of interest in the environment includes assigning to the object of interest coordinates, grid points, or mesh points within the map generated by the first SLAM operation.

Example 4. The method of any of examples 1-3, in which presenting the determined location of the object of interest in the environment includes generating a navigation path from a current location of the computing device to the location of the object of interest within the map generated by the first SLAM operation.

Example 5. The method of any of examples 1-4, in which presenting the determined location of the object of interest in the environment includes generating a navigation path from a current location of the computing device to the location of the object of interest within the map generated by the first SLAM operation.

Example 6. The method of any of examples 1-5, in which presenting the determined location of the object of interest in the environment includes generating a navigation path from a current location of the computing device to the location of the object of interest within the map generated by the first SLAM operation.

Example 7. The method of any of examples 1-6, in which the trigger event for presenting the location of the object of interest includes a user input received by the computing device requesting the location of the object of interest.

Example 8. The method of any of examples 1-7, further including correlating the object of interest in the environment with a user action or behavior, in which the trigger event for presenting the location of the object of interest includes detecting an occurrence of the user action or behavior.

Example 9. The method of any of examples 1-8, further including correlating the object of interest in the environment with a user location, in which the trigger event for presenting the location of the object of interest comprises detecting a user at or leaving a location.

Example 10. The method of any of examples 1-9, further including correlating the object of interest in the environment with a user action or behavior and another condition, in which the trigger event for presenting the location of the object of interest includes detecting an occurrence of the user action or behavior in conjunction with occurrence of the other condition.

Example 11. The method of any of examples 1-10, in which the trigger event for presenting the location of the object of interest includes a time trigger or a date trigger.

Example 12. The method of any of examples 1-11, further including: correlating a plurality of objects of interest with a user behavior or action; determining locations of each of the plurality of objects of interest in response to detecting the user behavior or action; and displaying a location of any of the plurality of objects of interest that is not located with the user.

Example 13. The method of any of examples 1-12, in which identifying an object of interest in the environment of the computing device by an object recognition operation using information received from the optical sensor includes: applying images of objects identified in the environment of the computing device to a trained neural network configured to provide as an output identifications of objects of interest; and determining a location in the environment of the object of interest provided as output by the trained neural network.

Example 14. The method of any of examples 1-13, further including: receiving an indication from a second computing device that the object of interest has been relocated to a second location in the environment; in which presenting the determined location of the object of interest in the environment includes presenting the second location of the object of interest in the map generated by the first SLAM operation.

Example 15. The method of example 14, wherein receiving an indication that the object of interest has been relocated to a second location in the environment includes receiving the indication that the object of interest has been relocated to a second location in the environment from a second computing device.

Example 16. The method of any of examples 14 or 15, in which presenting the determined location of the object of interest in the map generated by the first SLAM operation in response to a trigger event for presenting the location of the object of interest includes: determining whether the computing device is authorized to disclose the second location of the object of interest; presenting the second location of the object of interest in the map generated by the first SLAM operation in response to determining that the computing device is authorized to disclose the second location of the object of interest; and presenting an indication that the computing device is not authorized to disclose the second location of the object of interest in response to determining that the computing device is not authorized to disclose the second location of the object of interest.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods may be substituted for or combined with one or more operations of the methods.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the spirit or scope of the claims. Thus, the present disclosure is not intended to be limited to the embodiments shown herein but is to be accorded the widest scope consistent with the following claims and the principles and novel features disclosed herein.

What is claimed is:

1. A method performed by a computing device configured with an optical sensor for providing a location of an object of interest, comprising:
   generating a map of an environment around the computing device by a first simultaneous location and mapping (SLAM) operation using information received from the optical sensor;
   identifying an object of interest in the environment of the computing device by an object identification operation using information received from the optical sensor;
   determining a current location of the object of interest in the environment;
   receiving an indication that the object of interest has relocated to a second location in the environment;
   updating the current location using the second location of the object of interest;
   determining whether the computing device is not authorized to disclose the second location of the object of interest; and
   presenting an indication that the computing device is not authorized to disclose the second location of the object of interest in response to determining that the computing device is not authorized to disclose the second location of the object of interest.

2. The method of claim 1, wherein:
   generating the map of an environment around the computing device by the first SLAM operation using information received from an optical sensor of the computing device comprises identifying features of the environment around the computing device from the information received from the optical sensor and determining a position of the identified features; and
   identifying an object of interest in the environment of the computing device by an object recognition operation using information received from the optical sensor comprises identifying the object of interest while identifying features of the environment around the computing device from the information received from the optical sensor and determining the position of the identified features to generate the map.

3. The method of claim 1, wherein determining the current location of the object of interest in the environment comprises assigning to the object of interest coordinates, grid points, or mesh points within the map generated by the first SLAM operation.

4. The method of claim 1, wherein presenting the determined current location of the object of interest in the environment comprises generating a navigation path from a current location of the computing device to the location of the object of interest within the map generated by the first SLAM operation.

5. The method of claim 1, wherein presenting the determined current location of the object of interest in the environment comprises displaying an approximate distance from a current location of the computing device to the location of the object of interest.

6. The method of claim 1, wherein presenting the determined current location of the object of interest in the environment comprises displaying an indication of a direction to the location of the object of interest from a current location of the computing device.

7. The method of claim 1, wherein the trigger event for presenting the current location of the object of interest comprises a user input received by the computing device requesting the location of the object of interest.

8. The method of claim 1, further comprising correlating the object of interest in the environment with a user action or behavior, wherein the trigger event for presenting the location of the object of interest comprises detecting an occurrence of the user action or behavior.

9. The method of claim 1, further comprising correlating the object of interest in the environment with a user location, wherein the trigger event for presenting the location of the object of interest comprises detecting a user at or leaving a location.

10. The method of claim 1, further comprising correlating the object of interest in the environment with a user action or behavior and another condition, wherein the trigger event for presenting the current location of the object of interest comprises detecting an occurrence of the user action or behavior in conjunction with occurrence of the other condition.

11. The method of claim 1, wherein the trigger event for presenting the current location of the object of interest comprises a time trigger or a date trigger.

12. The method of claim 1, further comprising:
correlating a plurality of objects of interest with a user behavior or action;
determining locations of each of the plurality of objects of interest in response to detecting the user behavior or action; and
displaying a location of any of the plurality of objects of interest that is not located with a user.

13. The method of claim 1, wherein identifying an object of interest in the environment of the computing device by an object recognition operation using information received from the optical sensor comprises:
applying images of objects identified in the environment of the computing device to a trained neural network configured to provide as an output identifications of objects of interest; and
determining a current location in the environment of the object of interest provided as output by the trained neural network.

14. The method of claim 1, wherein determining whether the computing device is not authorized to disclose the second location of the object of interest comprises:
identifying a source of the indication that the object of interest has been relocated to the second location; and
determining whether the source of the indication that the object of interest has been relocated to the second location is authorized to disclose the second location.

15. The method of claim 14, wherein the source of the indication that the object of interest has been relocated to the second location is a second computing device configured with an optical sensor.

16. A computing device, comprising:
an optical sensor;
a display; and
a processor coupled to the optical sensor and the display, and configure to:
generate a map of an environment around the computing device by a first simultaneous location and mapping (SLAM) operation using information received from the optical sensor;
identify an object of interest in the environment of the computing device by an object identification operation using information received from the optical sensor;
determine a current location of the object of interest in the environment;
receive an indication that the object of interest has been relocated to a second location in the environment;
update the current location using the second location of the object of interest;
determine whether the computing device is not authorized to disclose the second location of the object of interest; and
present an indication that the computing device is not authorized to disclose the second location of the object of interest in response to determining that the computing device is not authorized to disclose the second location of the object of interest.

17. The computing device of claim 16, wherein the processor is further configured to:
generate the map of an environment around the computing device by the first SLAM operation using information received from an optical sensor of the computing device by identifying features of the environment around the computing device from the information received from the optical sensor and determining a position of the identified features; and
identify an object of interest in the environment of the computing device by an object recognition operation using information received from the optical sensor by identifying the object of interest while identifying features of the environment around the computing device from the information received from the optical sensor and determining the position of the identified features to generate the map.

18. The computing device of claim 16, wherein the processor is further configured to determine the current location of the object of interest in the environment by assigning to the object of interest coordinates, grid points, or mesh points within the map generated by the first SLAM operation.

19. The computing device of claim 16, wherein the processor is further configured to present the determined current location of the object of interest in the environment by generating a navigation path from a current location of the computing device to the location of the object of interest within the map generated by the first SLAM operation.

20. The computing device of claim 16, wherein the processor is further configured to present the determined current location of the object of interest in the environment by generating a navigation path from a current location of the computing device to the location of the object of interest within the map generated by the first SLAM operation.

21. The computing device of claim 16, wherein the processor is further configured to present the determined current location of the object of interest in the environment by generating a navigation path from a current location of the computing device to the location of the object of interest within the map generated by the first SLAM operation.

22. The computing device of claim 16, wherein the trigger event for presenting the current location of the object of interest comprises a user input received by the computing device requesting the location of the object of interest.

23. The computing device of claim 16, wherein the processor is further configured to correlate the object of interest in the environment with a user action or behavior, wherein the trigger event for presenting the location of the object of interest comprises the processor detecting an occurrence of the user action or behavior.

24. The computing device of claim 16, wherein the processor is further configured to correlate the object of interest in the environment with a user location, wherein the trigger event for presenting the current location of the object of interest comprises detecting a user at or leaving a location.

25. The computing device of claim 16, wherein the processor is further configured to correlate the object of interest in the environment with a user action or behavior and another condition, wherein the trigger event for presenting the current location of the object of interest comprises the processor detecting an occurrence of the user action or behavior in conjunction with occurrence of the other condition.

26. The computing device of claim 16, wherein the trigger event for presenting the current location of the object of interest comprises a time trigger or a date trigger.

27. The computing device of claim 16, wherein the processor is further configured to:
   correlate a plurality of objects of interest with a user behavior or action;
   determine locations of each of the plurality of objects of interest in response to detecting the user behavior or action; and
   display a location of any of the plurality of objects of interest that is not located with a user.

28. The computing device of claim 16, wherein the processor is further configured to identify an object of interest in the environment of the computing device by an object recognition operation using information received from the optical sensor by:
   applying images of objects identified in the environment of the computing device to a trained neural network configured to provide as an output identifications of objects of interest; and
   determining a location in the environment of the object of interest provided as output by the trained neural network.

29. The computing device of claim 16, wherein the processor coupled to the optical sensor and the display, is further configured to determine whether the computing device is not authorized to disclose the second location of the object of interest by:
   identifying a source of the indication that the object of interest has been relocated to the second location; and
   determining whether the source of the indication that the object of interest has been relocated to the second location is authorized to disclose the second location.

30. The computing device of claim 4, wherein the source of the indication that the object of interest has been relocated to the second location is a second computing device configured with an optical sensor.

31. A computing device, comprising:
   an optical sensor;
   means for generating a map of an environment around the computing device by a first simultaneous location and mapping (SLAM) operation using information received from the optical sensor;
   means for identifying an object of interest in the environment of the computing device by an object identification operation using information received from the optical sensor;
   means for determining a current location of the object of interest in the environment;
   means for receiving an indication that the object of interest has been relocated to a second location in the environment;
   means for updating the current location using the second location of the object of interest;
   means for determining whether the computing device is not authorized to disclose the second location of the object of interest; and
   means for presenting an indication that the computing device is not authorized to disclose the second location of the object of interest in response to determining that the computing device is not authorized to disclose the second location of the object of interest.

\* \* \* \* \*